US007776971B2

(12) United States Patent
Percec

(10) Patent No.: US 7,776,971 B2
(45) Date of Patent: Aug. 17, 2010

(54) PROCESSES FOR THE SYNTHESIS OF DENTRITIC MACROMOLECULES FROM CONVENTIONAL MONOMERS

(75) Inventor: Virgil Percec, Philadelphia, PA (US)

(73) Assignee: The Trustees Of The University Of Pennsylvania, Philadelphia, PA (US)

( * ) Notice: Subject to any disclaimer, the term of this patent is extended or adjusted under 35 U.S.C. 154(b) by 797 days.

(21) Appl. No.: 10/555,599

(22) PCT Filed: May 6, 2004

(86) PCT No.: PCT/US2004/013933

§ 371 (c)(1),
(2), (4) Date: Mar. 23, 2006

(87) PCT Pub. No.: WO2004/101629

PCT Pub. Date: Nov. 25, 2004

(65) Prior Publication Data

US 2006/0183865 A1    Aug. 17, 2006

(51) Int. Cl.
C08F 297/02 (2006.01)
C08F 297/00 (2006.01)
C08F 8/00 (2006.01)

(52) U.S. Cl. .......................... 525/342; 525/50; 525/55; 525/191; 525/242; 525/309; 525/310; 525/326.1

(58) Field of Classification Search ................. 525/191, 525/242, 259, 309, 310, 50, 55, 326.1, 342
See application file for complete search history.

(56) References Cited

U.S. PATENT DOCUMENTS 6,284,850 B1    9/2001    Percec
6,306,995 B1 *  10/2001   Wang .......................... 526/348

OTHER PUBLICATIONS

Percec, Virgil et al "Synthesis of Functional Aromatic Multisulfonyl Chlorides and Their Masked Precursors" Journal of Organic Chemisty vol. 66, pp. 2104-2117 published online Feb. 23, 2001.*

Percec, Virgil, et al. "Designing Functional Aromatic Multisulfonyl Chloride Initiators for Complex Organic Synthesis by Living Radical Polymerization" Journal of Polymer Science Part A: Polymer Chemistry vol. 38, pp. 4776-4791 published online Nov. 27, 2000.*
Ciferri, A. ed. "Supramolecular Polymers" Marcel Dekker Inc., new York, NY published in 2000.*
Percec, Virgil et al., "Universal Iterative Strategy for the Divergent Synthesis of Dendritic Macromolecules from Conventional Monomers by a Combination of Living Radical Polymerization and Irreversible TERminator Multifunctional INItiator (TERMINI)," Journal of American Chemical Society, 125(21), 6503-6516, May 6, 2003, XP002477984.
Percec, Virgil et al., "Toward self-assembling dendritic macromolecules from conventional monomers by a combination of living radical polymerization and irreversible terminator multifunctional initiator," Journal of Polymer Science, Part A: Polymer Chemistry, 42(3), 505-513, Dec. 12, 2003, XP002477985.
Percec, Virgil et al., "Termini: A universal method for the synthesis of hyperbranched and dendritic macromolecules from conventional monomers via living radical polymerization," Polymer Preprints, American Chemical Society, US, vol. 43, No. 2, 2002, pp. 173-174, XP009099211.
Percec, Virgil et al., "Termini: A universal method for the synthesis of hyperbranched and dendritic macromolecules from conventional monomers via living radical polymerization," American Chemical Society, Abstracts of Paper, at the 224th ACS National Meeting, American Chemical Society, Boston, MA, US, 2002, XP009099213.

* cited by examiner

*Primary Examiner*—Irina S Zemel
*Assistant Examiner*—Jeffrey Lenihan
(74) *Attorney, Agent, or Firm*—Woodcock Washburn, LLP

(57) ABSTRACT

The inventive subject matter relates to novel synthetic processes which use a multifunctional compound (the "TERMINI compound") having a masked or protected functional group, wherein the TERMINI compound is capable of quantitatively and irreversibly interrupting a living polymerization or a chain organic reaction. After deprotection or demasking of the functional group of the TERMINI compound, the same living polymerization or organic reaction resumes with 100% efficiency, or a different living polymerization or organic reaction resumes with 100% chemoselectivity, respectively. Once incorporated into a growing molecule, the TERMINI compound generates a branching point upon resumption of the polymerization or reaction.

7 Claims, 12 Drawing Sheets

Fig. 5(a)
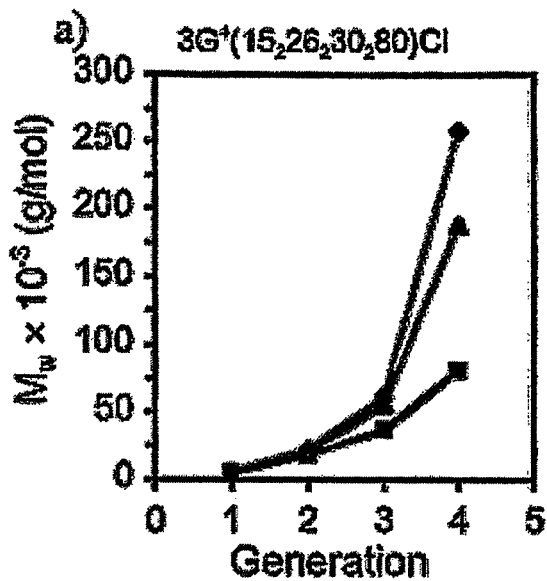
Fig. 5(b)
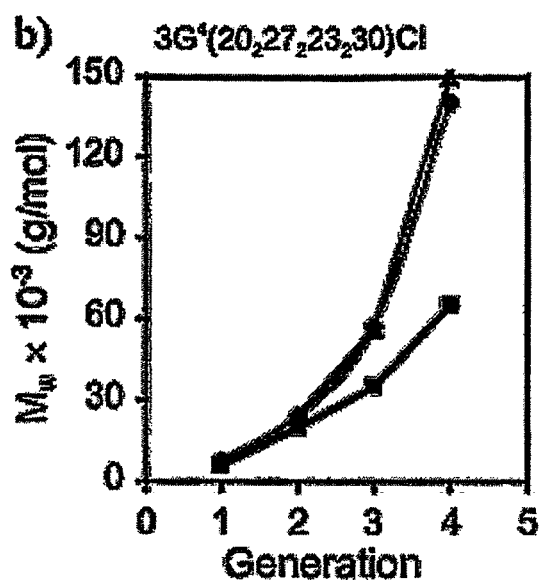
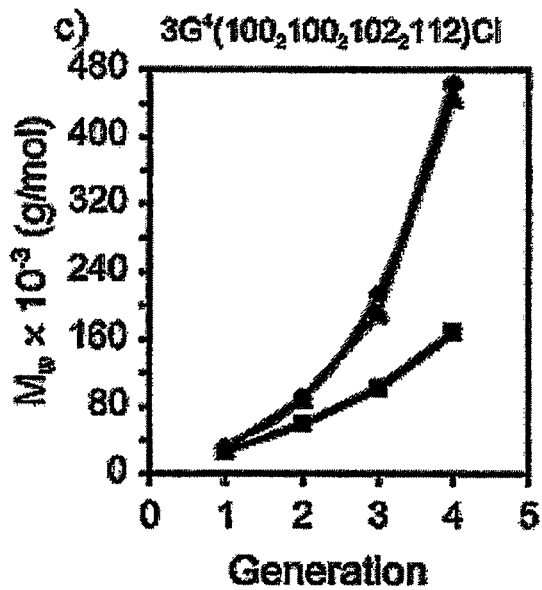
Fig. 5(c)
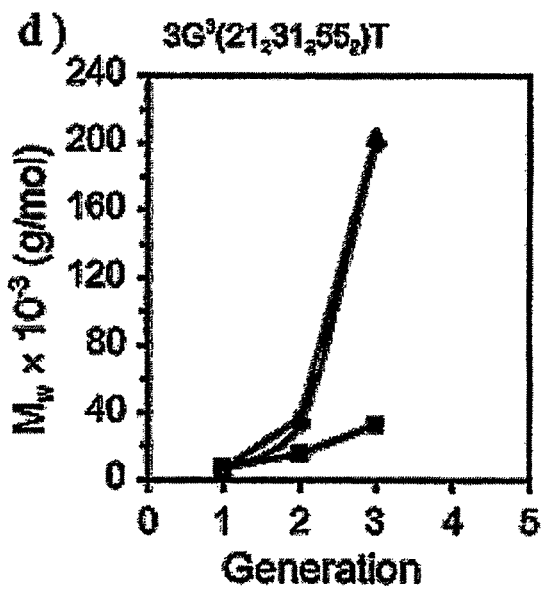
Fig. 5(d)

PROCESSES FOR THE SYNTHESIS OF DENTRITIC MACROMOLECULES FROM CONVENTIONAL MONOMERS

This work was supported in part by National Science Foundation Grant Nos. DMR-99-96288, DMR-01-02459, and DMR-00-79909. The United States government may have rights in the inventive subject matter by virtue of this support.

BACKGROUND OF THE INVENTIVE SUBJECT MATTER

1. Field of the Inventive Subject Matter

The inventive subject matter relates to novel synthetic processes which use a multifunctional compound (the "TERMINI compound") having a masked or protected functional group, wherein the TERMINI compound is capable of quantitatively and irreversibly interrupting a living polymerization or a chain organic reaction. After deprotection or demasking of the functional group of the TERMINI compound, the same living polymerization or organic reaction resumes with 100% efficiency, or a different living polymerization or organic reaction resumes with 100% chemoselectivity, respectively. Once incorporated into a growing molecule, the TERMINI compound generates a branching point upon resumption of the polymerization or reaction.

2. Background

It is expected that dendritic macromolecules will have increasing future importance in such diverse fields as nanoelectronics, for example electronics based on organic thin-film materials, and nanobiology. Presently, there are no simple, efficient, and cost effective processes for the synthesis of dendritic macromolecules. Current methods are expensive and not fully selective.

The general state of the patent art relating to dendritic polymers, and their uses, is described in the following U.S. patents.

U.S. Pat. No. 5,731,095 to Milco, et al., issued Mar. 24, 1998, discloses water-soluble or water-dispersible fluorine-containing dendritic polymer surfactants.

U.S. Pat. No. 5,886,110 to Gozzini, et al. issued Mar. 23, 1999, discloses branched, dendrimeric macromolecules having a central nucleus and a series of polyoxaalkylene chains that radiate from the nucleus and spread into the surrounding space, branching in a cascade fashion until the desired size results.

U.S. Pat. No. 6,020,457 to Klimash, et al. issued Feb. 1, 2000, discloses dendritic polymers containing disulfide functional groups which are essentially inert under non-reducing conditions, but which form sulfhydryl groups upon being subjected to a reducing agent, and their uses in the formation of differentiated dendrimers, formation of binding reagents for diagnostics, drug delivery, gene therapy and magnetic resins imaging, and in the preparation of self-assembled dendrimer monolayers on quartz crystal resonators to provide dendrimer-modified electrodes which are useful for detecting various ions or molecules.

U.S. Pat. No. 6,077,500 to Dvornic, et al., issued Jun. 20, 2000, discloses higher generation radially layered copolymeric dendrimers having a hydrophilic poly(amidoamine) or a hydrophilic poly(propyleneimine) interior and a hydrophobic organosilicon exterior, and their uses for delivering active species for use in catalysis, pharmaceutical applications, drug delivery, gene therapy, personal care, and agricultural products.

U.S. Pat. No. 6,136,921 to Hsieh, et al., issued Oct. 24, 2000, discloses a coupled polymer which is prepared by reacting a living alkali metal-terminated polymer with a coupling agent, having good rubbery physical properties, transparency, and wear resistance.

U.S. Pat. No. 6,312,809 to Crooks, et al., issued Nov. 6, 2001, discloses a substrate having a dendrimer monolayer film covalently bonded to the surface, and uses as a chemically sensitive surface, such as in chemical sensors.

The prior art has been ineffective in developing simple, efficient, and cost effective processes for the synthesis of dendritic macromolecules. Applicant has developed methods for the synthesis of complex chemical compounds with the shape perfection required to act as self-organizing and self-assembling building blocks to generate supramolecular objects in both novel and predictable structural lattices. When a supramolecular object exhibits an internal ordered structure rather than a micelle-like structure, the retrostructural analysis of the lattice enables the formulation of a primary structure-activity relationship that provides molecules with designed functions. Applicant has further found that novel dendritic macromolecules may be simply, efficiently, and cost effectively synthesized by the inventive methods. In particular, Applicant has developed new methods for the synthesis of complex molecular and macromolecular chemical compounds by a combination of living polymerization reactions and TERMINI synthesis.

SUMMARY OF THE INVENTION

The inventive subject matter relates to a process for making a dendritic macromolecule from conventional monomers using a combination of polymerization and an irreversible terminator multifunctional initiator, comprising the steps of:
(a) initiating the polymerization of a monomer using a multi-functional sulfonyl halide initiator having a number of sulfonyl halide functional groups, to produce a branched polymer having a number of arms corresponding to the number of sulfonyl halide functional groups of said sulfonyl halide initiator;
(b) quantitatively end-capping said branched polymer with an excess of a TERMINI compound having a thiocarbamate group, to produce an end-terminated branched polymer having a TERMINI thiocarbamate group terminating one or more branches of said branched polymer; and
(c) demasking a TERMINI thiocarbamate group to produce a sulfonyl halide group by oxidative chlorination, thereby transforming a masked sulfonyl halide into an active sulfonyl halide initiator group.

The inventive subject matter further relates to a process for making a dendritic macromolecule from conventional monomers using a combination of living radical polymerization and an irreversible terminator multifunctional initiator, which comprises the steps of:
(a) initiating a $Cu_2O$/biphenyl-2,3-diol catalyzed living radical polymerization of methyl methacrylate using 3PSC as a trifunctional initiator, to produce a star polymer $3G^1(n)Cl$ having three arms,
wherein 3 is for a trifunctional core, $G^1$ refers to the first generation, n is the degree of polymerization per arm, and Cl is the functionality present at the chain ends of each arm;
(b) quantitatively end-capping said $3G^1(n)Cl$ using a four times excess of TERMINI compound, to produce $3G^1(n_2)T$,
wherein subscript 2 from $3G^1(n_2)T$ is the number of new arms generated from each TERMINI compound branching point located at the end of poly(methyl methacrylate) of degree of polymerization n, while each T is a TERMINI compound chain end; and (c) demasking N,N'-diethylthiocarbamate groups of the $3G^1(n_2)T$ into sulfonyl chloride groups by oxidative chlorination of $3G^1(n_2)T$, to transform masked sulfonyl chlorides into active aryl sulfonyl chloride initiator groups, to produce $3G^1(n_2)SC$, wherein SC is sulfonyl chloride to initiate the metal catalyzed living radical polymerization of methyl methacrylate to produce the second generation $3G^2$ $(n_2m)Cl$, wherein m is the degree of polymerization per arm of poly(methyl methacrylate) from said second generation.

In addition, the inventive subject matter relates to a dendritic macromolecule produced by a process comprising the steps of:

(a) initiating the polymerization of a monomer using a multi-functional sulfonyl halide initiator having a number of sulfonyl halide functional groups, to produce a branched polymer having a number of arms corresponding to the number of sulfonyl halide functional groups said sulfonyl halide initiator has;

(b) quantitatively end-capping said branched polymer with an excess of a TERMINI compound having a thiocarbamate group, to produce an end-terminated branched polymer having a TERMINI thiocarbamate group terminating one or more branches of said branched polymer;

(c) demasking a TERMINI thiocarbamate group to produce a sulfonyl halide group by oxidative chlorination, thereby transforming a masked sulfonyl halide into an active sulfonyl halide initiator group;

(d) optionally repeating steps (b) and (c); and (e) isolating said dendritic macromolecule.

BRIEF DESCRIPTION OF THE DRAWINGS

FIG. 5(a) is a graph which depicts the dependence of $M_{th}$, $M_{n,GPC}$, and $M_{n,SEC-MALLS}$ on the generation number of dendritic poly(methyl methacrylate) $3G^4(15_226_230_280)Cl$.

FIG. 5(b) is a graph which depicts the dependence of $M_{th}$, $M_{n,GPC}$, and $M_{n,SEC-MALLS}$ on the generation number of dendritic poly(methyl methacrylate) $3G^1(20_227_223_230)Cl$.

FIG. 5(c) is a graph which depicts the dependence of $M_{th}$, $M_{n,GPC}$, and $M_{n,SEC-MALLS}$ on the generation number of dendritic poly(methyl methacrylate) $3G^4(100_2100_2102_2112)Cl$.

FIG. 5(d) is a graph which depicts the dependence of $M_{th}$, $M_{n,GPC}$, and $M_{n,SEC-MALLS}$ on the generation number of dendritic poly(methyl methacrylate) $3G^3(21_231_255_2)T$.

DETAILED DESCRIPTION OF THE INVENTION

Definitions

Figure 1:
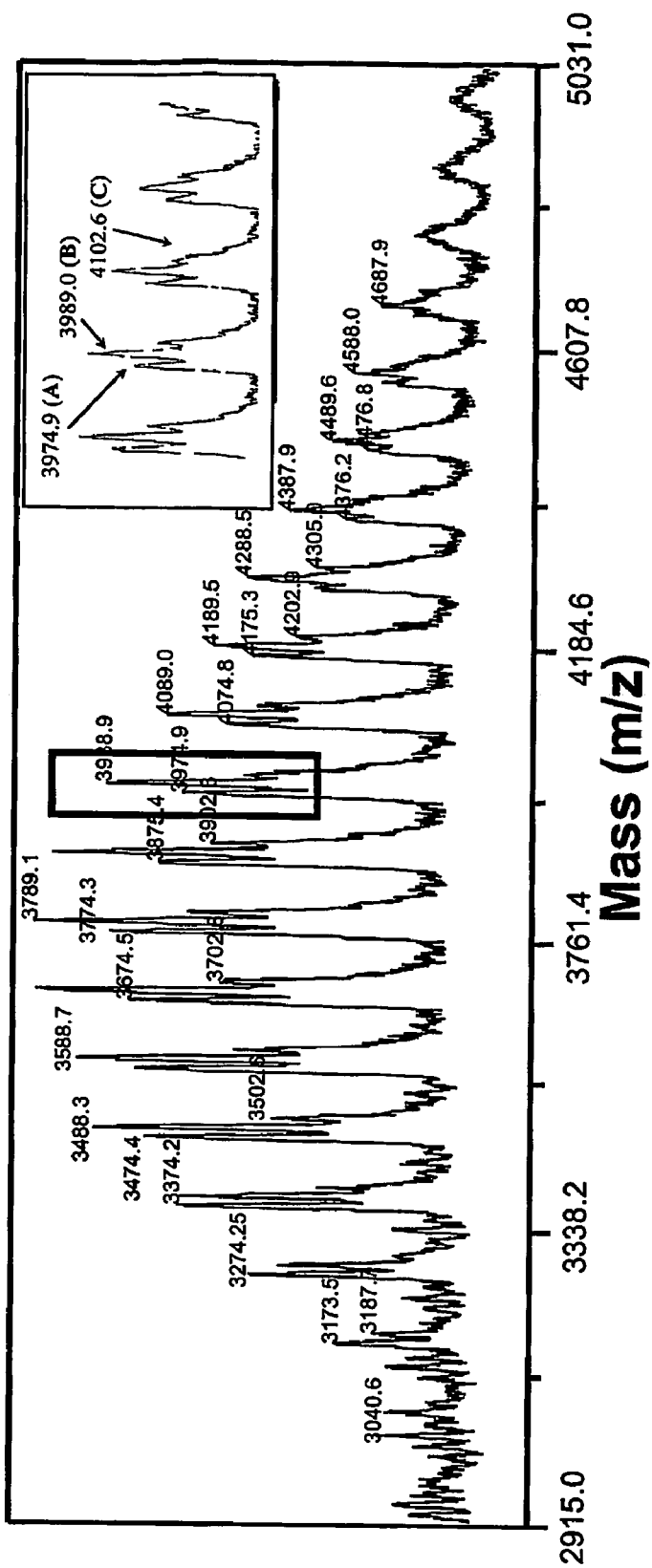
FIG. 1 is a graph which depicts MALDI-TOF analysis of $3G^1(6_2)T$ synthesized in accord with inventive Method-B.

The term "dendritic" as used herein refers to highly branched molecules, often having multiple layers of branching.

The term "macromolecule" as used herein refers to a very large molecule, which may be composed of hundreds of thousands of atoms. Particularly relevant to the inventive subject matter, polymers are exemplary macromolecules.

The term "halide" as used herein refers to a salt of any halogen acid. The term "halogen" as used herein refers to a group of nonmetallic elements including fluorine, chlorine, bromine, iodine, and astatine.

The term "monomer" as used herein refers to a molecular entity which, when joined together with other monomers, form a polymer.

The term "polymer" as used herein refers to a long chain of repeated, covalently bonded atoms or molecules.

The term "branched polymer" as used herein refers to a polymer with one or more chemical side chain(s) extending from the primary molecular backbone.

The term "aryl" as used herein refers to an alicyclic or aromatic, mono-, bi- or tricyclic, carbo- or heterocyclic ring, wherein the ring is optionally substituted with one or more substituent(s) independently selected from the group consisting of alkylamino, amido, amino, aminoalkyl, azo, benzyloxy, $C_1$-$C_9$ straight or branched chain alkyl, $C_1$-$C_9$ alkoxy, $C_2$-$C_9$ alkenyloxy, $C_2$-$C_9$ straight or branched chain alkenyl, $C_3$-$C_8$ cycloalkyl, $C_5$-$C_7$ cycloalkenyl, carbonyl, carboxy, cyano, diazo, ester, formanilido, halo, haloalkyl, hydroxy, imino, isocyano, isonitrilo, nitrilo, nitro, nitroso, phenoxy, sulfhydryl, sulfonylsulfoxy, thio, thioalkyl, thiocarbonyl, thiocyano, thioester, thioformamido, trifluoromethyl, and carboxylic and heterocyclic moieties; wherein the individual alicyclic or aromatic ring contains 5-8 members and wherein said heterocyclic ring contains 1-6 heteroatom(s) independently selected from the group consisting of O, N, and S; and wherein any aromatic or tertiary alkyl amine is optionally oxidized to a corresponding-oxide.

The term "living polymerization" as used herein refers to a chain growth polymerization which proceeds in the absence of chain breaking terminations, and which can be used to produce essentially monodisperse polymers.

Inventive Methods

Applicant has developed new methods for the synthesis of dendritic macromolecules by suitable combinations of irreversible terminator multifunctional initiator synthesis, also called "TERMINI" synthesis, and polymerization reactions such as living radical polymerization. The inventive methods provide for the synthesis of molecular and macromolecular compounds of unprecedented complexity from commercially available monomers.

TERMINI synthesis involves a masked multifunctional initiator designed to quantitatively and irreversibly interrupt a chain organic reaction or a living polymerization. After demasking, the TERMINI compound enables re-initiation quantitatively and becomes a branching point, in the presence or absence of a catalyst, of the same or a different living polymerization or a chain organic reaction, in more than one direction. In an exemplary method, Applicant has developed a combination of metal catalyzed living radical polymerization and the use of (1,1-dimethylethyl) [[1-[3,5-bis(S-phenyl 4-N,N'-diethylthiocarbamate)phenyl]ethenyl]oxy]dimethylsilane in TERMINI synthesis, in a novel method for the synthesis of dendritic macromolecules based on methyl methacrylate.

Thus, the inventive subject matter relates to a process for making a dendritic macromolecule from conventional monomers using a combination of polymerization and an irreversible terminator multifunctional initiator, comprising the steps of:

(a) initiating the polymerization of a monomer using a multi-functional sulfonyl halide initiator having a number of sulfonyl halide functional groups, to produce a branched polymer having a number of arms corresponding to the number of sulfonyl halide functional groups of said sulfonyl halide initiator;

(b) quantitatively end-capping said branched polymer with an excess of a TERMINI compound having a thiocarbamate group, to produce an end-terminated branched polymer having a TERMINI thiocarbamate group terminating one or more branches of said branched polymer; and (c) demasking a TERMINI thiocarbamate group to produce a sulfonyl halide group by oxidative chlorination, thereby transforming a masked sulfonyl halide into an active sulfonyl halide initiator group.

In another aspect of the inventive subject matter, said process additionally comprises the step of isolating said branched polymer produced in step (a).

In an alternate aspect of the inventive subject matter, said process additionally comprises the step of isolating said end-terminated branched polymer produced in step (b).

In a preferred embodiment, said process additionally comprises the steps of isolating said branched polymer produced in step (a) and isolating said end-terminated branched polymer produced in step (b).

In another preferred embodiment, said process additionally comprises repeating steps (b) and (c) one or more times.

In another aspect of the inventive subject matter, said polymerization is living radical polymerization.

In a preferred embodiment, said living radical polymerization is catalyzed.

In a more preferred embodiment, said living radical polymerization is metal-catalyzed.

In a further more preferred embodiment, said living radical polymerization is catalyzed by $Cu_2O$/biphenyl-2,3-diol.

In another aspect of the inventive subject matter, said monomer is selected from the group consisting of methacrylates, acrylates, acrylonitriles, methacrylonitriles, styrenes, and a mixture or combination thereof.

In a preferred embodiment, said monomer is methyl methacrylate.

In a further aspect of the inventive subject matter, said sulfonyl halide is an aryl sulfonyl halide.

In a preferred embodiment, said halide is chloride.

In yet another aspect of the inventive subject matter, said multi-functional sulfonyl halide initiator is tri-functional.

In a preferred embodiment, said tri-functional sulfonyl halide initiator is 1,1,1-tris(4-chlorosulfonylphenyl)ethane.

In another aspect of the inventive subject matter, said TERMINI compound is (1,1-dimethylethyl) [[1-[3,5-bis(S-phenyl 4-N,N'-diethylthiocarbamate)phenyl]ethenyl]oxy]dimethylsilane.

In a preferred embodiment of the inventive subject matter, said excess of a TERMINI compound is about four times excess.

The inventive subject matter further relates to a process for making a dendritic macromolecule from conventional monomers using a combination of living radical polymerization and an irreversible terminator multifunctional initiator, which comprises the steps of:

(a) initiating a $Cu_2O$/biphenyl-2,3-diol catalyzed living radical polymerization of methyl methacrylate using 3PSC as a trifunctional initiator, to produce a star polymer $3G^1(n)Cl$ having three arms,
wherein 3 is for a trifunctional core, $G^1$ refers to the first generation, n is the degree of polymerization per arm, and Cl is the functionality present at the chain ends of each arm;

(b) quantitatively end-capping said $3G^1(n)Cl$ using a four times excess of TERMINI compound, to produce $3G^1(n_2)T$,
wherein subscript 2 from $3G^1(n_2)T$ is the number of new arms generated from each TERMINI compound branching point located at the end of poly(methyl methacrylate) of degree of polymerization n, while each T is a TERMINI compound chain end; and (c) demasking N,N'-diethylthiocarbamate groups of the $3G^1(n_2)T$ into sulfonyl chloride groups by oxidative chlorination of $3G^1(n_2)T$, to transform masked sulfonyl chlorides into active aryl sulfonyl chloride initiator groups, to produce $3G^1(n_2)SC$, wherein SC is sulfonyl chloride to initiate the metal catalyzed living radical polymerization of methyl methacrylate to produce the second generation $3G^2$ $(n_2m)Cl$, wherein m is the degree of polymerization per arm of poly(methyl methacrylate) from said second-generation.

In a preferred embodiment, said TERMINI compound is (1,1-dimethylethyl) [[1-[3,5-bis(S-phenyl 4-N,N'-diethylthiocarbamate)phenyl]ethenyl]oxy]dimethylsilane.

Synthetic Strategies. Selected reaction conditions for the control of chain end functionality, number average molecular weight (hereinafter "$M_n$") and polydispersity of linear macromolecules generated by metal catalyzed living radical polymerization initiated with aryl and alkyl sulfonyl chloride initiators are known. We have controlled the synthesis of dendritic macromolecules by selecting reaction reagents, producing macromolecules based on methyl methacrylate using a combination of metal catalyzed living radical polymerization and TERMINI synthesis.

N,N'-diethylthiocarbamate was selected as an exemplary mask for aryl sulfonyl chloride, since sulfonyl chlorides represent the most efficient class of universal initiators for the living radical polymerization of a variety of monomers. Alkyl halide based initiators undergo dimerization reactions during the initiation step of a living radical polymerization. By contrast, aryl sulfonyl chlorides provides 100% initiation efficiency and a much higher rate of initiation than propagation for styrenes, methacrylates, and acrylates. These two characteristics of aryl sulfonyl chlorides warranted their selection for the introduction of branching points. In addition, we have found an exemplary demasking process which transforms an N,N'-diethylthiocarbamate into an aryl sulfonyl chloride in several minutes at room temperature under very mild conditions. Aryl enol ether was selected as an exemplary 1,1-disubstituted olefin fragment of TERMINI synthesis, which upon addition to radical species interrupts irreversibly their chain growth process. Scheme 1 illustrates the key final step of TERMINI synthesis.

SCHEME 1

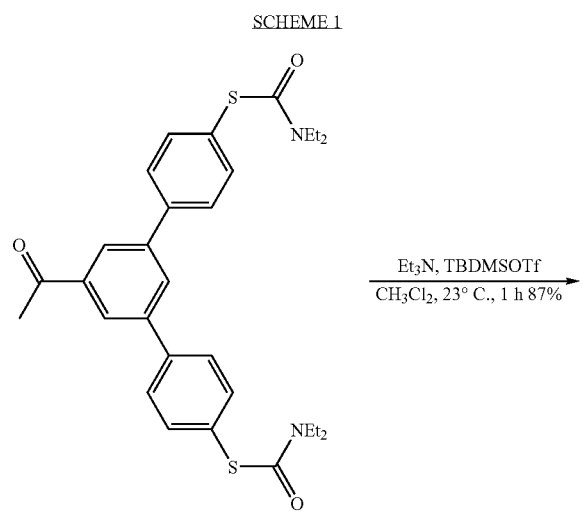

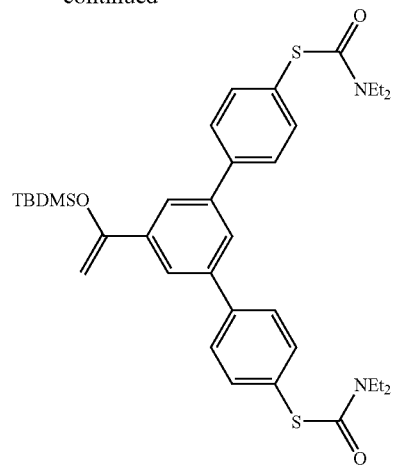

Scheme 1 depicts the final step of the synthesis of the (1,1-dimethylethyl) [[1-[3,5-bis(S-phenyl 4-N,N'-diethylthiocarbamate)phenyl]ethenyl]oxy]dimethylsilane TERMINI compound. (1,1-dimethylethyl) [[1-[3,5-bis(S-phenyl 4-N, N'-diethylthiocarbamate)phenyl]ethenyl]oxy]dimethylsilane is obtained in five steps (55.3% overall yield) starting from 4-methoxyphenylboronic acid and 3,5-dibromo acetophenone. The first four steps of this synthesis were reported by us in Percec, V.; Bera, T. K.; De, B. B.; Sanai, Y.; Smith, J.; Holerca, M. N.; Barboiu, B.; Grubbs, R. B.; Fréchet, J. M. J; *Synthesis of functional aromatic multisulfonyl chlorides and their masked precursors*; J. Org. Chem. 66:2104 (2001), which is incorporated by reference in its entirety. tert-butyldimethylsilyltrifluoromethanesulfonate, (hereinafter "TBDMSOTf") was used for the step depicted in Scheme 1, since it provides the t-butyldimethylsiloxy (hereinafter "TBDMS") enol ether under mild reaction conditions and in high yield.

The TBDMS group offers sufficient stability to the enol ether both for long time storage and under the metal catalyzed reaction conditions selected for the end-capping process. Since enol ethers are cleaved under acidic conditions, for this step we have employed our previously developed self-regulated catalytic system based on $Cu_2O$/biphenyl-2,3-diol. This catalytic system maintains neutral reaction conditions throughout all synthetic steps and creates only the required concentration of highly reactive, nascent CuCl species in-situ, via a self-regulated mechanism. The small concentration of highly reactive nascent CuCl facilitates the production of an extremely low concentration of radical species and thus minimizes undesirable radical side-reactions. An important aspect of the TERMINI compound is that after end-capping, the excess of the unreacted enol ether or its precursor are recovered and reused. This provides an economic synthetic method since an excess of TERMINI compound is used in each end-capping step.

Synthesis of a first generation dendritic poly (methyl methacrylate) based on a TERMINI compound in conjunction with the trifunctional initiator 1,1,1-tris(4-chlorosulfonylphenyl)ethane (hereinafter "3PSC") and methyl methacrylate, is depicted in Scheme 2.

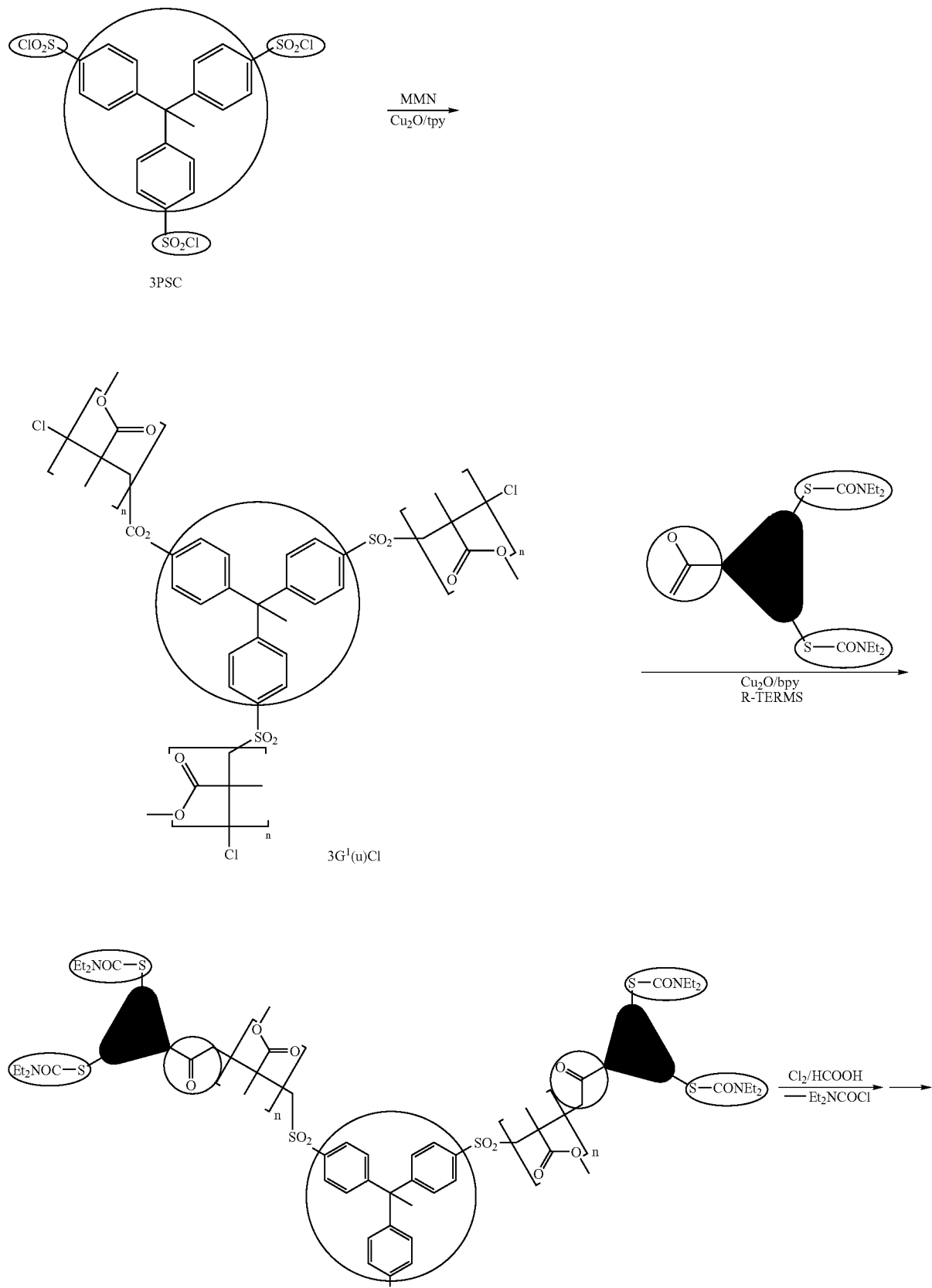

-continued
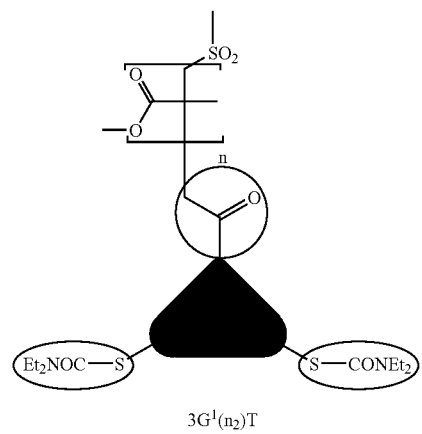
3G¹(n₂)T
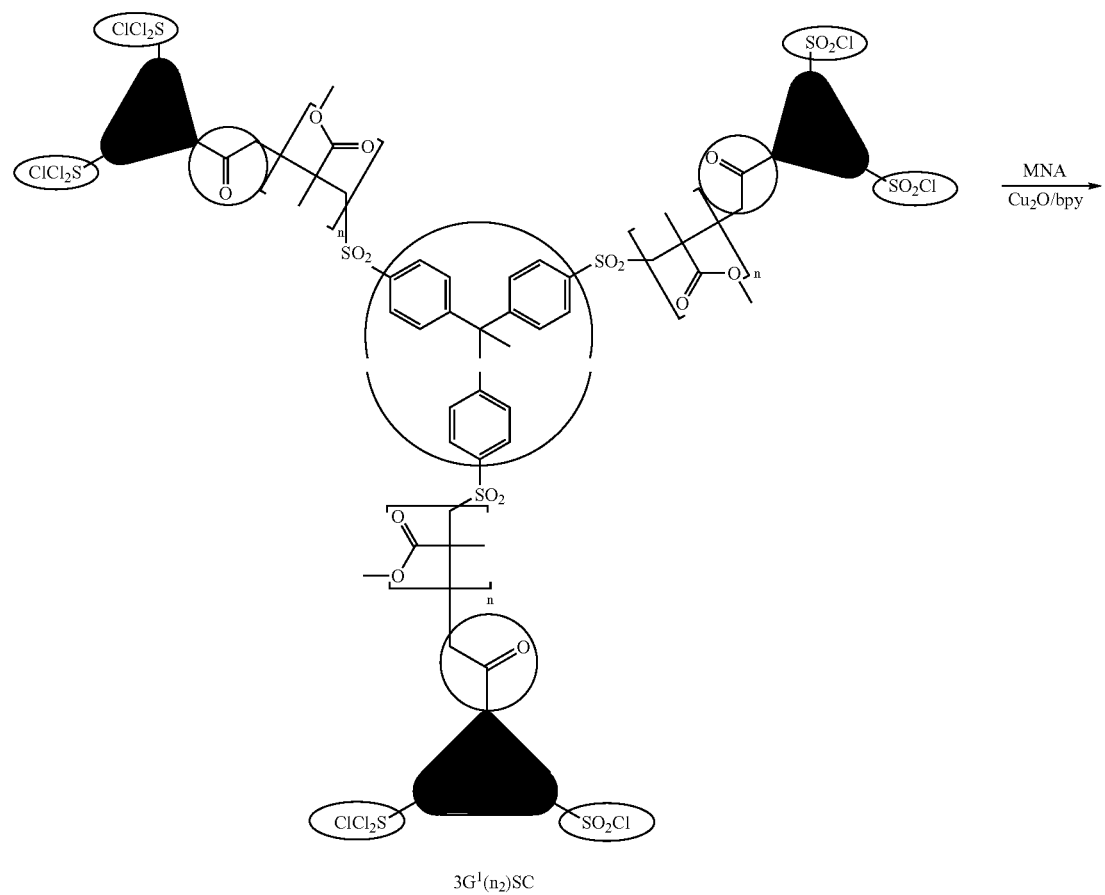
3G¹(n₂)SC

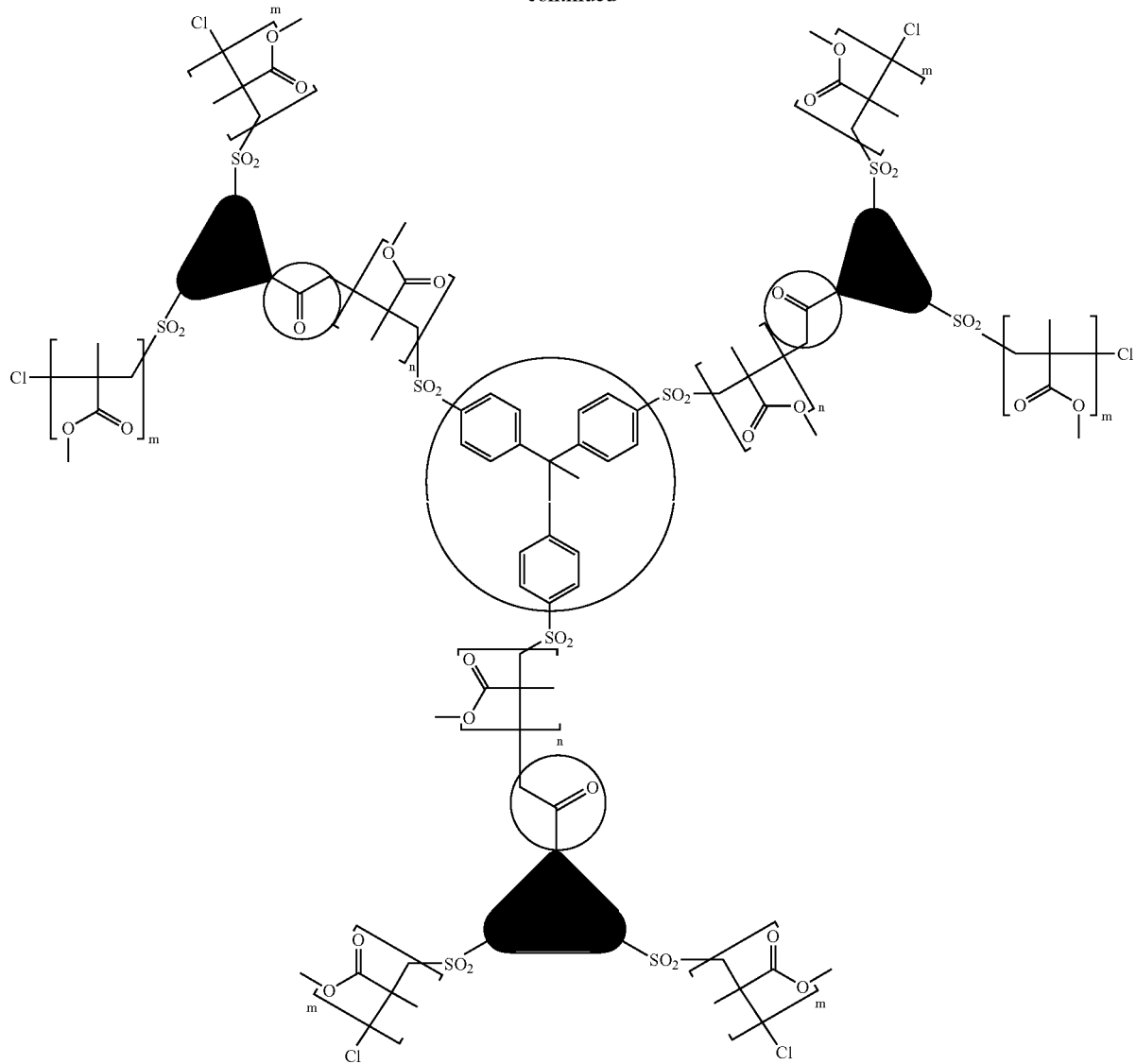
$3G^2(n_2m)Cl$
wherein each 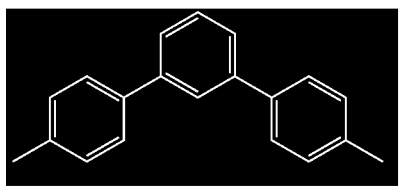 represents 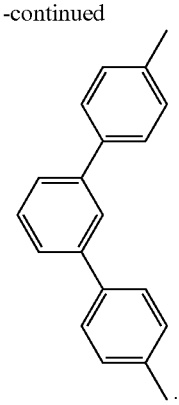.

Scheme 2 depicts a general method for the synthesis of a dendritic poly(methyl methacrylate) using a combination of living radical polymerization and TERMINI synthesis. In the first step, 3PSC is used as a trifunctional initiator to initiate the $Cu_2O$/biphenyl-2,3-diol catalyzed living radical polymerization of methyl methacrylate and produce a star polymer $3G^1(n)Cl$ having three arms, where 3 stands for a trifunctional core, $G^1$ refers to the first generation, n is the degree of polymerization (hereinafter "DP") per arm and Cl is the functionality present at the chain ends of each arm. Previously we have demonstrated by a combination of kinetic and structural analysis experiments that both 3PSC and the disulfonyl chloride resulted from TERMINI synthesis initiate the living radical polymerization of methyl methacrylate with 100% efficiency. During the synthesis of $3G^1(n)Cl$ the conversion of methyl methacrylate is monitored most conveniently by $^1$H-NMR spectroscopy.

In the second step of this sequence of reactions, $3G^1(n)Cl$ is quantitatively end-capped using an excess of TERMINI compound. An excess is required to avoid radical side-reactions and to produce $3G^1(n_2)T$. Four times excess is preferred. Subscript 2 from $3G^1(n_2)T$ is the number of new arms generated from each TERMINI compound branching point located at the end of poly(methyl methacrylate) of degree of polymerization=n, while T stands for TERMINI compound chain ends. This reaction step is monitored by a combination of $^1$H-NMR, gel permeation chromatography (hereinafter "GPC"), size exclusion chromatography-multi-angle light scattering, (hereinafter "SEC-MALLS"), and when possible by matrix assisted laser desorption ionization time of flight (hereinafter "MALDI-TOF") spectrometry. For early generations the combination of $^1$H-NMR, GPC, and MALDI-TOF provides the most efficient method of structural analysis. However, for higher generations or for dendritic macromolecules with a high degree of polymerization of poly(methyl methacrylate) per arm, SEC-MALLS becomes the most suitable method of analysis. MALDI-TOF analysis of $3G^1(6_2)T$ is used here as an example to demonstrate the perfect control of the first two reaction steps.

FIG. 1 depicts the MALDI-TOF analysis of $3G^1(6_2)T$ synthesized by in-situ $Cu_2O$/biphenyl-2,3-diol catalyzed end-capping of the methyl methacrylate polymerization initiated with 3PSC (Method-B). Three homologous series of peaks have been identified: $A=3G^1(6_2)T+Na^+$; $B=3G^1(6_2)T+K^+$; $C=3G^1(6_2)T+Ag^+-H^+$. The three series of peaks A, B, and C from FIG. 1 contain the initiator and three TERMINI compound moieties as α and ω chain ends of poly (methyl methacrylate) branches, respectively. The difference between these peaks in the same series equals the corresponding molar mass of the methyl methacrylate unit that is 100.12. Therefore, this MALDI-TOF analysis demonstrates the quantitative end-capping of $3G^1(6_2)Cl$ with TERMINI compound groups.

Generally, in the inventive processes, one skilled in the art will understand that, in addition to protection and deprotection of the functionalities of the TERMINI groups, one may need to protect or block various other reactive functionalities on the starting compounds or intermediates while a desired reaction is carried out on other portions of the molecule. After the desired reactions are complete, or at any desired time, normally such protecting groups will be removed by, for example, hydrolytic or hydrogenolytic means. Such protection and deprotection steps are conventional in organic chemistry. One skilled in the art is referred to "Protective Groups in Organic Chemistry," McOmie, ed., Plenum Press, New York, N.Y.; and "Protective Groups in Organic Synthesis," 3$^{rd}$ Edition, Greene, ed., John Wiley & Sons, New York, N.Y. (1999) for the teaching of protective groups which may be useful in the inventive processes.

Figure 2:
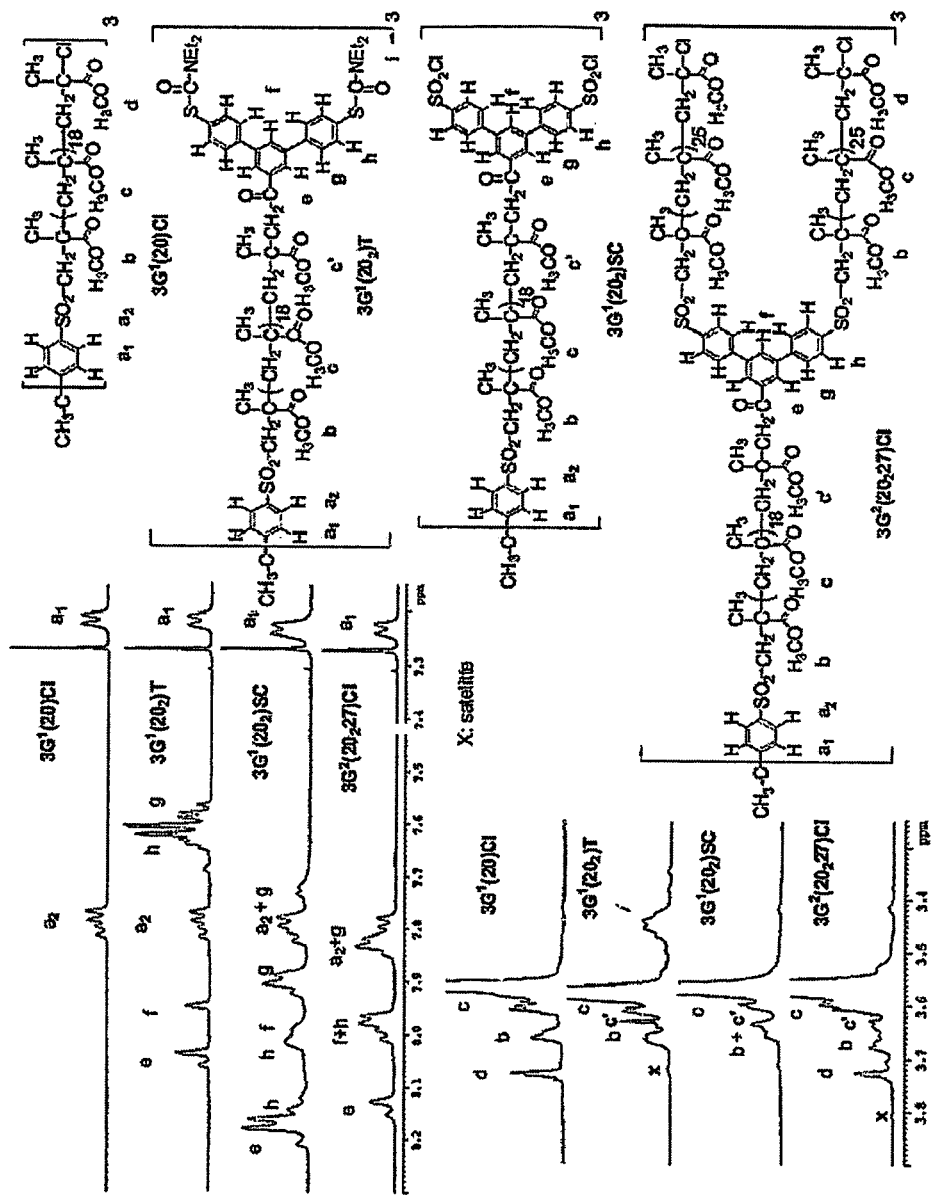
FIG. 2 is a series of comparative graphs which depict 500 MHz $^1$H-NMR analysis of the intermediary products generated during the synthesis of $3G^2(20_227)Cl$ starting from $3G^1(20)Cl$.

The third step of this method involves the demasking that transforms the N,N'-diethylthiocarbamate groups of the $3G^1(n_2)T$ into sulfonyl chloride groups. This step is accomplished by oxidative chlorination of $3G^1(n_2)T$ under mild conditions (7 min, at 23° C.) to transform quantitatively the masked sulfonyl chlorides of TERMINI compound fragment into the active aryl sulfonyl chloride initiator groups. Details of this reaction step were reported previously. The resulting $3G^1(n_2)$ SC, where SC stands for sulfonyl chloride is a hexafunctional initiator capable to initiate the metal catalyzed living radical polymerization of methyl methacrylate to produce the second generation $3G^2(n_2m)Cl$, where m stands for the degree of polymerization per arm of poly(methyl methacrylate) from the second generation. The instability of sulfonyl chlorides under the MALDI-TOF analysis conditions does not allow the use of this method for the structural analysis of $3G^1(n_2)$ SC. Therefore, a combination of GPC, 500 MHz $^1$H-NMR, SEC-MALLS and kinetic analysis was employed for the structural analysis of $3G^1(n_2)SC$ and for the demonstration of its structure. After the synthesis of $3G^1(n_2)SC$, the previous sequence of these reaction steps that involves metal catalyzed living radical polymerization of methyl methacrylate, end-capping with TERMINI compound and demasking was reiterated to produce four generations of dendritic macromolecules. For each generation each of these reaction steps is monitored by a combination of 500 MHz $^1$H-NMR spectroscopy, MALDI-TOF, GPC and SEC-MALLS. FIG. 2 depicts a 500 MHz $^1$H-NMR analysis of the intermediary products generated during the synthesis of $3G^2(20_227)Cl$ starting from $3G^1(20)Cl$.

Two alternate methods are described to synthesize dendritic macromolecules according to the inventive subject matter, consisting of three reaction steps each and utilizing the general synthetic pathways depicted below in Scheme 3.

SCHEME 3

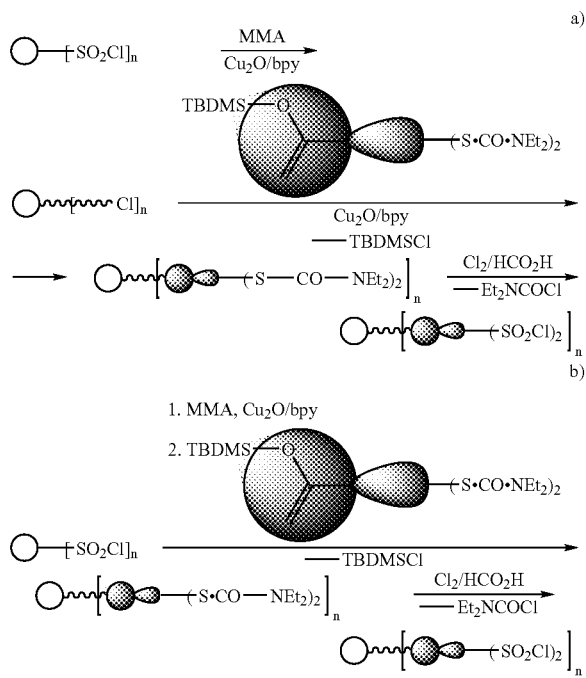

Scheme 3 depicts two methods for the synthesis of dendritic macromolecules by a combination of living radical polymerization and TERMINI synthesis: (a) Method-A: Consisting of Three Steps, Three-Pots per Iteration (b) Method-B: Consisting of Three Steps, Two-Pots per Iteration. Method-A is based on an iterative process in which the required sequence of three reaction steps i.e., living radical polymerization, end-capping and demasking are executed separately. In Method-B, the living radical polymerization and end-capping are combined in a two-steps one-pot process. Subsequently, in Method-B TERMINI compound is added to the reaction at a predetermined conversion during the living radical polymerization process. As a consequence, in one aspect of the inventive subject matter, the first two steps of the Method-A are combined, thus eliminating the need for the isolation and purification of the resulted dendritic macromolecule after the first reaction step. Therefore, Method-B reduces the time involved for the synthesis of one generation. These two methods complement each other in terms of controlled chemical compound, functionality of the chain ends, and number of purification steps.

The product and intermediates may be isolated or purified using one or more standard purification techniques, including, for example, one or more of simple solvent evaporation, recrystallization, distillation, sublimation, filtration, chromatography, including thin-layer chromatography, HPLC (e.g. reverse phase HPLC), column chromatography, flash chromatography, radial chromatography, trituration, and the like.

New Dendritic Architectural Motifs Accessible by a Combination of Living Radical Polymerization and Termini Synthesis. A detailed inspection of FIG. 12 reveals the capabilities of the new iterative methods from Scheme 3 for the synthesis of dendritic macromolecules.

FIG. 12 depicts dendritic macromolecules accessible by the combination of living radical polymerization of methyl methacrylate and the bifunctional TERMINI compound starting from the 3PSC-trifunctional initiator: (a) containing various degree of polymerization of the poly(methyl methacrylate) per arm; (b) degree of polymerization of poly(methyl methacrylate) equal to zero; (c) degree of polymerization of poly(methyl methacrylate) equal to one.

We refer to the structure of the fourth generation $3G^4$ $(n_2m_2p_2q_2)Cl$ from FIG. 12. When the degree of polymerization of poly(methyl methacrylate) in each generation is zero, the resulting dendritic macromolecule, as shown in FIG. 12(b), has a perfect structure of relatively uniform size that resembles the structure of conventional dendrimers prepared by traditional divergent methods. This structure can be synthesized by eliminating the polymerization step from Scheme 3 and is envisioned by deleting the poly(methyl methacrylate) branches from the structure of $3G^4(n_2m_2p_2q_2)Cl$ of FIG. 12(a). A structure of relatively uniform size is also obtained for the case in which the degree of polymerization of poly (methyl methacrylate) from each branch is equal to one in each generation, as shown in FIG. 12(c). We have previously described synthetic methods for the addition of only one monomer unit to any sulfonyl chloride initiator and thus the synthesis of the structures illustrated in FIG. 12(c) are synthetically accessible. The last two methods for the synthesis of dendrimers of relatively uniform size have been developed, and will be reported in future publications.

At least three different classes of dendritic macromolecules can be envisioned when the degree of polymerization of poly(methyl methacrylate) per branch is larger than one. In all cases the resulted dendritic macromolecules have a perfect degree of branching with a branching multiplicity equal to two and therefore, they differ from hyperbranched polymers for which there is no control over their degree of branching. At the same time they have a narrow molecular weight distribution $(M_w/M_n)$ of the poly(methyl methacrylate) segments. As a consequence, these dendritic macromolecules differ from conventional monodisperse dendrimers synthesized by either divergent or convergent methods.

Figures 4A, 4B, 4C:
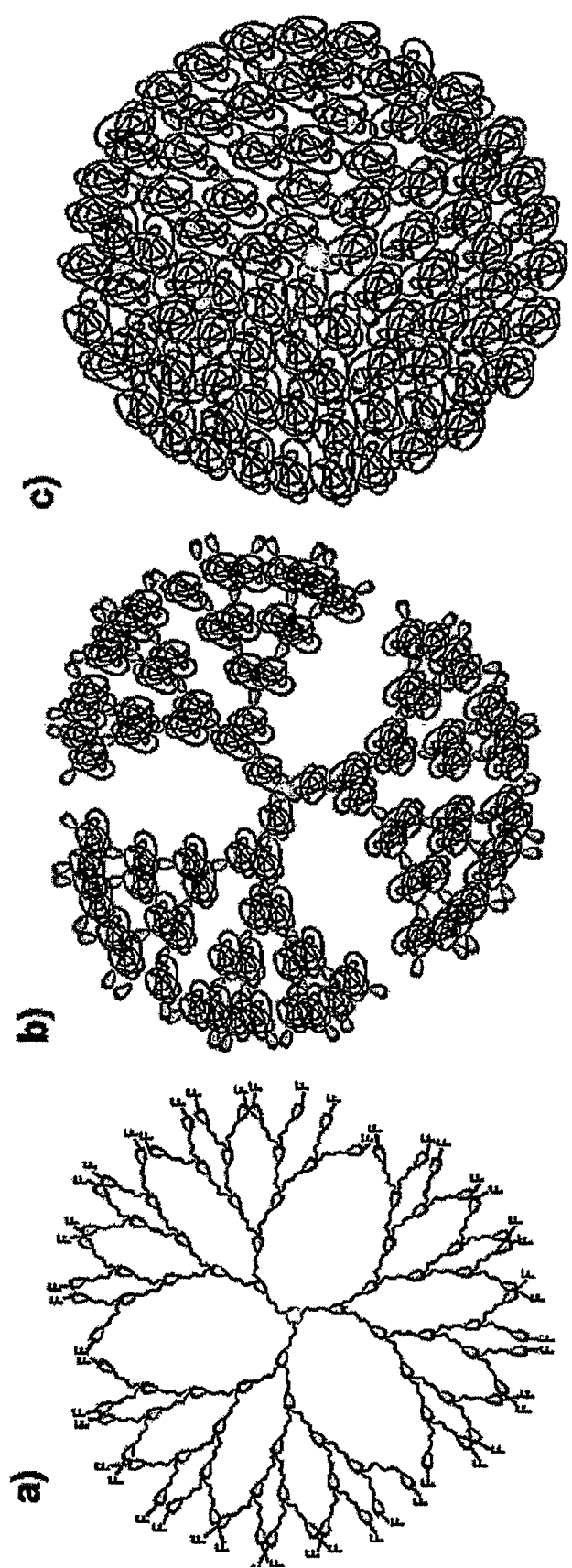
FIG. 4(a) is a drawing which depicts a representative dendritic macromolecule having a small degree of polymerization of poly(methyl methacrylate).
FIG. 4(b) is a drawing which depicts a representative dendritic macromolecule having a medium degree of polymerization of poly(methyl methacrylate).
FIG. 4(c) is a drawing which depicts a representative dendritic macromolecule having a large degree of polymerization of poly(methyl methacrylate).

FIG. 4 depicts dendritic macromolecules containing: (a) small degree of polymerization of poly(methyl methacrylate) to provide short and stiff chains between branching points; (b) medium degree of polymerization of poly(methyl methacrylate) to provide flexible random coil conformation between the branching points; (c) large degree of polymerization of poly(methyl methacrylate) to provide long entangled chains between branching points; F: functional groups. In the first class of dendritic macromolecules accessible by the combination of living radical polymerization and TERMINI synthesis, depicted in FIG. 4(a), the degree of polymerization per branch is larger than one but lower than the degree of polymerization that defines the persistence length of poly(methyl methacrylate). In this case the poly(methyl methacrylate) repeat units between branches are stiff and as a consequence each branch is fully elongated. The second class, shown in FIG. 4(b), refers to DPs larger than the one corresponding to the persistence length of poly(methyl methacrylate) but lower than the degree of polymerization that corresponds to the $M_n$ that produces entangled chains. In this case the poly(methyl methacrylate) branches adopt a random-coil conformation. The third case, as shown in FIG. 4(c), refers to DPs that correspond to $M_n$ values that are larger than the entanglement molecular weight.

These three classes of dendritic macromolecules have no precedent and are expected to exhibit completely different physical properties both between themselves and when compared with classic dendrimers. In addition to these three classes, combinations of different degree of polymerization per branch as those described in the cases from FIGS. 3a, b and c can be incorporated within a single dendritic macromolecule. Finally, within any of the above-mentioned chemical compounds the structure of each generation can be changed by simply employing a different monomer. In addition, the structure of the outer shell of these dendritic macromolecules can be functionalized with different groups shown as F in FIG. 4a. Last but not least, the structures of these dendritic macromolecules can be modified by performing a diversity of chemical reactions on their repeat units.

Synthesis and Structural Analysis of Four Series Each Containing Four Generations of Dendritic poly(methyl methacrylate) by Using Method-A. The sequence of three iterative reactions combined as in Method-A was used to demonstrate the TERMINI synthesis inventive subject matter for the synthesis of three series of dendritic poly(methyl methacrylate). Each of these series of dendritic poly(methyl methacrylate) contains four generations and the most representative data referring to their synthesis and structural characterization are summarized in Table 1.

TABLE 1

Synthesis of Three Series of Three Arms Core Dendritic poly (methyl methacrylate) Each Containing Four-Generations by using Method-A

| | [MMA], M | [—SO$_2$Cl] ×10$^2$, M | [Cu$_2$O] ×10$^2$, M | Conv %/ Time, h | M$_{th}$ × 10$^{-3}$ | M$_n$ × 10$^{-3}$ GPC | M$_w$/M$_n$ GPC | dn/dc$^3$ SEC-MALLS | M$_n$ × 10$^{-3}$ SEC-MALLS |
|---|---|---|---|---|---|---|---|---|---|
| 3G$^1$(15)Cl | 6.71 | 42.9 | 5.0 | 96/14 | 5.2 | 4.7 | 1.15 | — | — |
| 3G$^2$(15$_2$26)Cl | 4.0 | 13.1 | 5.0 | 85/21 | 22.1 | 18.2 | 1.06 | 0.11 | 20.0 |
| 3G$^3$(15$_2$26$_2$30)Cl | 3.48 | 6.5 | 4.4 | 56/36 | 60.7 | 36.4 | 1.08 | 0.12 | 55.75 |
| 3G$^4$(15$_2$26$_2$30$_2$80)Cl | 4.64 | 2.9 | 2.8 | 50/52 | 258.1 | 81.0 | 1.13 | 0.13 | 187.5 |
| 3G$^1$(20)Cl | 3.1 | 9.3 | 1.76 | 60/12 | 7.7 | 6.1 | 1.12 | — | — |
| 3G$^2$(20$_2$27)Cl | 2.17 | 4.0 | 1.37 | 50/14 | 24.5 | 20.1 | 1.08 | 0.09 | 24.53 |
| 3G$^3$(20$_2$27$_2$23)Cl | 1.68 | 4.0 | 1.15 | 56/12 | 57.5 | 35.4 | 1.05 | 0.093 | 56.21 |
| 3G$^4$(20$_2$27$_2$23$_2$30)Cl | 0.77 | 1.33 | 1.15 | 52/22 | 140.1 | 65.2 | 1.09 | 0.135 | 149.4 |
| 3G$^1$(100)Cl | 4.78 | 2.4 | 1.59 | 50/14 | 30.59 | 26.0 | 1.12 | 0.083 | 29.11 |
| 3G$^2$(100$_2$100)Cl | 4.22 | 2.11 | 1.56 | 50/18 | 91.00 | 59.0 | 1.12 | 0.085 | 89.27 |
| 3G$^3$(100$_2$100$_2$112)Cl | 3.42 | 1.71 | 1.54 | 56/7 | 213.76 | 102.2 | 1.19 | 0.085 | 191.2 |
| 3G$^4$(100$_2$100$_2$112$_2$102)Cl | 1.69 | 0.84 | 1.36 | 51/9 | 464.0 | 168.2 | 1.23 | 0.087 | 446.1 |

DP$_{ARM}$ = conv × [M]$_0$/[I]$_0$/n, [Cu$_2$O]/[biphenyl-2,3-diol] = ½,
T = 90° C., p-xylene, dn/dc in cm$^3$g$^{-1}$ Table 1 provides data on the synthesis and the structure of these dendritic poly(methyl methacrylate) that include the degree of polymerization of poly(methyl methacrylate) per branch in each generation (column 1), the most relevant reaction conditions employed in their synthesis (columns 2, 3, 4, 5 and footnote), the molecular weights of the dendritic macromolecules determined by three different methods (columns 6, 7, 10), their molecular weight distribution determined from GPC analysis (column 8) and the specific incremental refractive index, dn/dc, values (column 9) used in the determination of the average molecular weight (column 10) by SEC-MALLS.

The degree of polymerization of poly(methyl methacrylate) per branch reported in the first column of Table 1 corresponds to the theoretical molecular weight from the sixth column and was calculated by the combination of kinetic, $^1$H-NMR and gravimetric analysis described above.

This value is determined by multiplying the theoretical degree of polymerization at 100% conversion, i.e., [MMA]$_0$/[—SO$_2$Cl]$_0$ obtained from column two and three with the monomer conversion reported in column five. The M$_n$ values reported in column seven were determined by GPC calibrated with poly(methyl methacrylate) standards. Since dendritic macromolecules have a hydrodynamic volume smaller than the corresponding linear poly(methyl methacrylate) these M$_{n,GPC}$ values are, as expected, only relative and their dependence versus the real molecular weight (M$_{th}$) is strongly influenced by generation number.

For example, at the first and, depending on DP, even at the second generation there is a relatively good agreement between M$_{n, GPC}$ and M$_{th}$. However, at higher generations M$_{n, GPC}$ are lower than the absolute values. The difference between M$_{n, GPC}$ and M$_{th}$ increases by increasing the generation number. This trend demonstrates that at and above generation two or three the dendritic macromolecules adopt the expected globular shape. This trend can be best observed by inspecting FIGS. 5(a), (b), and (c), which displays the dependence of M$_{th}$, M$_{n, GPC}$ and M$_{n, SEC-MALLS}$ from Table 1 versus generation number, n, for all three series of dendritic macromolecules synthesized by Method-A ((a) 3G$^4$(15$_2$26$_2$30$_2$80)Cl; (b) 3G$^4$(20$_2$27$_2$23$_2$30)Cl; (c) 3G$^4$(100$_2$100$_2$102$_2$112)Cl), and as shown in FIG. 5(d), for a set of dendritic poly(methyl methacrylate) 3G$^3$(21$_2$31$_2$55$_2$)T prepared by Method-B.

Applicant has found that the present series of dendritic macromolecules adopts a dendritic globular shape depending on degree of polymerization per branch at generation two or three. For example these generations are lower than those at which Fréchet type and other dendrimers undergo the transition to a globular shape. A careful inspection of FIG. 5 shows that the onset of the globular shape is indicated by the deviation of the absolute molecular weight from the GPC molecular weight. This deviation is observed at generation two, FIG. 5(c), for dendritic poly(methyl methacrylate) with degree of polymerization=100 per branch and respectively 21 and 31 per branch as shown in FIG. 5 (d). At lower DPs per branch, shown in FIGS. 5(a) and 5(b), this deviation is observed at generation three. This trend demonstrates that the larger degree of polymerization per branch facilitates a globular shape at lower generations. This trend is most probably associated with the flexibility of poly(methyl methacrylate) branches that increases with the increase in degree of polymerization and therefore, facilitates a globular shape more than the corresponding stiffer branches of lower DPs. This result will permit the design of dendritic macromolecules with globular shapes determined not only by the generation number but also by the flexibility of their branches that in the method of synthesis described here can be controlled both by the structure of the monomer and by its degree of polymerization per branch. In addition, the molecular weight distribution of the dendritic macromolecules reported in Table 1 is about as narrow as that reported for conventional "monodisperse" dendritic macromolecules that were prepared either by convergent or divergent methods.

The dn/dc values of all dendritic poly(methyl methacrylate) for which the absolute molecular weights were determined by SEC-MALLS experiments are reported in column 9 of Table 1. As expected, and observed experimentally, the dn/dc values of these dendritic macromolecules are depending on the generation number, and for each generation their dn/dc value is determined by the degree of polymerization of poly(methyl methacrylate) per branch. The strongest dependence of the dn/dc on generation number is for the series of dendritic macromolecules with the lowest degree of polymerization per branch. For dendritic macromolecules with the largest degree of polymerization per branch the dn/dc values are close to the value reported for poly(methyl methacrylate)

(dn/dc=0.086 cm$^3$g$^{-1}$). Finally, the last column in Table 1 summarizes the absolute molecular weight determined from SEC-MALLS experiments.

Examining the results in Table 1, some of the capabilities of the synthetic Method-A and of the most significant reaction parameters on the structure of the dendritic macromolecules is apparent. The first series from Table 1 has DPs of poly (methyl methacrylate) per branch of 15, 26, 30 and 80. Attempts to produce a series of dendritic macromolecules with degree of polymerization equal to 10 in each generation number was less successful because of the low solubility at the sulfonyl chloride stage of the dendritic structure. This is an expected behavior since a degree of polymerization equal to 10 produces a dendritic macromolecule with stiff branches. However, this solubility problem can be alleviated by small changes of the degree of polymerization per branch in each generation. This explains the selection of degree of polymerization per branch for the first series of dendritic macromolecules from Table 1. GPC traces of this series are presented in FIG. 6(a). All these GPC traces show a monomodal and narrow molecular weight distribution in spite of the very high monomer conversions employed (96 and 85%) during the synthesis of the first and second generations.

Figures 6A, 6B, 6C:
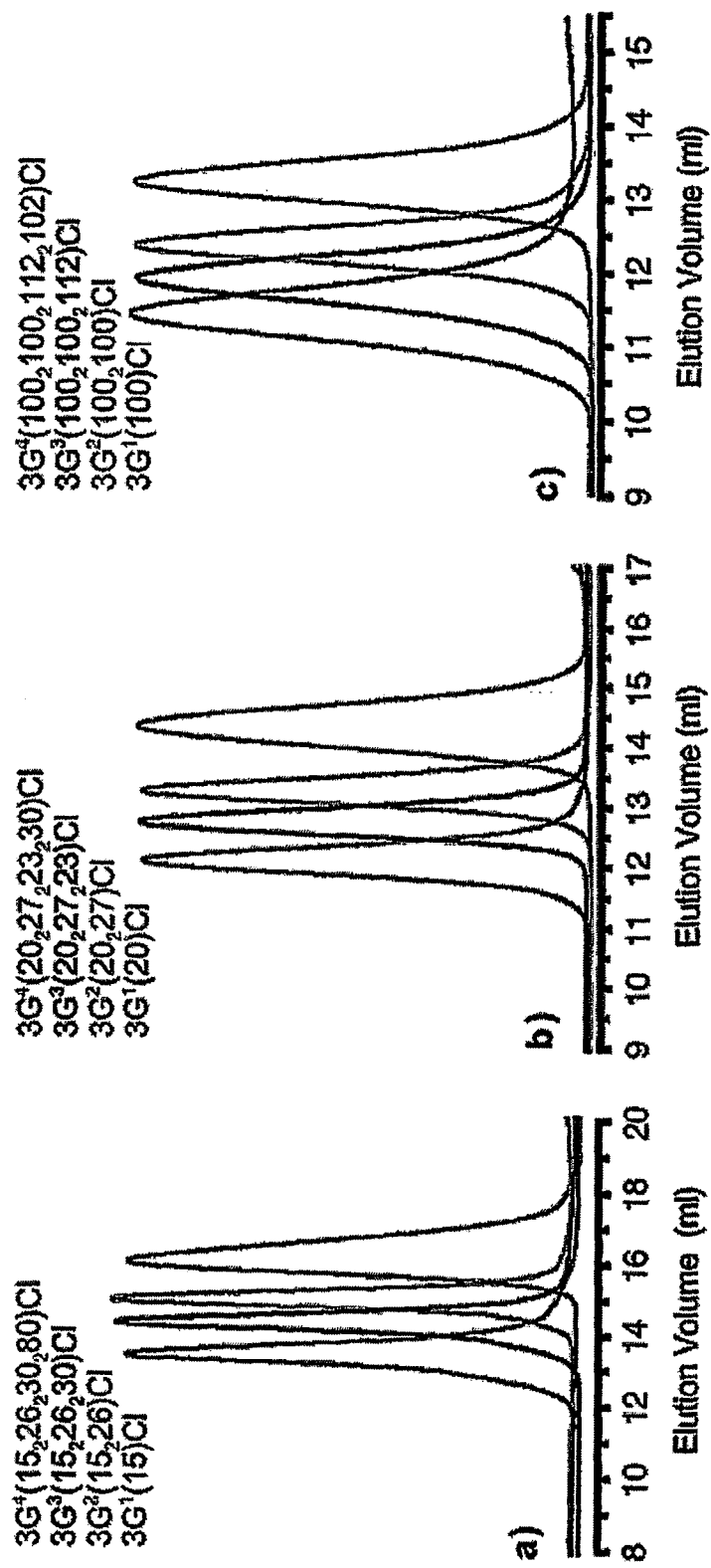
FIG. 6(a) is a graph which depicts GPC analysis of dendritic poly(methyl methacrylate) $3G^4(15_226_230_280)Cl$.
FIG. 6(b) is a graph which depicts GPC analysis of dendritic poly(methyl methacrylate) $3G^1(20_227_223_230)Cl$.
FIG. 6(c) is a graph which depicts GPC analysis of dendritic poly(methyl methacrylate) $3G^4(100_2100_2102_2112)Cl$.

FIG. 6 depicts GPC analysis of dendritic poly(methyl methacrylate) synthesized by a combination of living radical polymerization and TERMINI synthesis by using Method-A: (a) 3G$^4$(15$_2$26$_2$30$_2$80)Cl; (b) 3G$^4$(20$_2$27$_2$23$_2$30)Cl; and (c) 3G$^4$(100$_2$100$_2$102$_2$112)Cl. It is expected that at very high conversions termination reactions that are second order in growing radicals are favored since the monomer concentration is very low. However, neither GPC traces obtained with UV/RI detectors nor SEC-MALLS traces were able to detect any side reactions. In addition, at generations three and four there is an excellent agreement between the absolute molecular weight determined by SEC-MALLS and the M$_{th}$ (Table 1). In spite of the fact that the monomer conversion was lowered during the synthesis of generations three and four, the first discrepancy between the M$_{th}$ and M$_{n,\ SEC-MALLS}$ occurs at generation four. A more detailed inspection of the GPC trace of 3G$^4$(15$_2$26$_2$30$_2$80)Cl from FIG. 6(a) shows a very small deviation from the symmetric shape of the curve at lower elution volumes and therefore, at higher molecular weights. We believe that a small amount of sample with higher molecular weight is obtained via termination by combination most probably during the first and second generation and becomes visible by GPC and SEC-MALLS analysis only at generation four. This provides the discrepancy between the M$_{th}$ and M$_{n,\ SEC-MALLS}$ from Table 1. The conclusion derived from this analysis is that in each generation the monomer conversion is expected to be limited to about 50%.

The second series of dendritic macromolecules from Table 1 was synthesized with DPs of 20, 27, 23 and 30 per arm, at monomer conversions maintained between 50 and 60%. Dendritic macromolecules with excellent monomodal GPC traces were obtained and are shown in FIG. 6(b). As shown in Table 1, the agreement between M$_{th}$ and M$_{n,\ SEC-MALLS}$ for this series is excellent, and this demonstrates that our decision to interrupt the polymerization at lower conversions eliminated the previously observed deviations of the experimental absolute molecular weights (M$_{n,\ SEC-MALLS}$) from the theoretical one (M$_{th}$). The GPC traces from FIG. 6(b) and $^1$H-NMR analysis discussed above for FIG. 2, for the first two generations, demonstrate excellent control during the synthesis of all four generations. The third series of dendritic macromolecules contains DPs of 100, 100, 112 and 102 per branch. This series was obtained at monomer conversions between 50 and 56%. No solubility problems were encountered at any generation and functional chain-end when the poly(methyl methacrylate) dendritic macromolecules have a degree of polymerization of at least 50 per branch. Excellent agreement between M$_{th}$ and M$_{n,\ SEC-MALLS}$ in addition to narrow M$_w$/M$_n$ values, as shown in Table 1 and FIG. 6(c), was observed for all generations when the degree of polymerization per branch was about 100.

Figure 7:
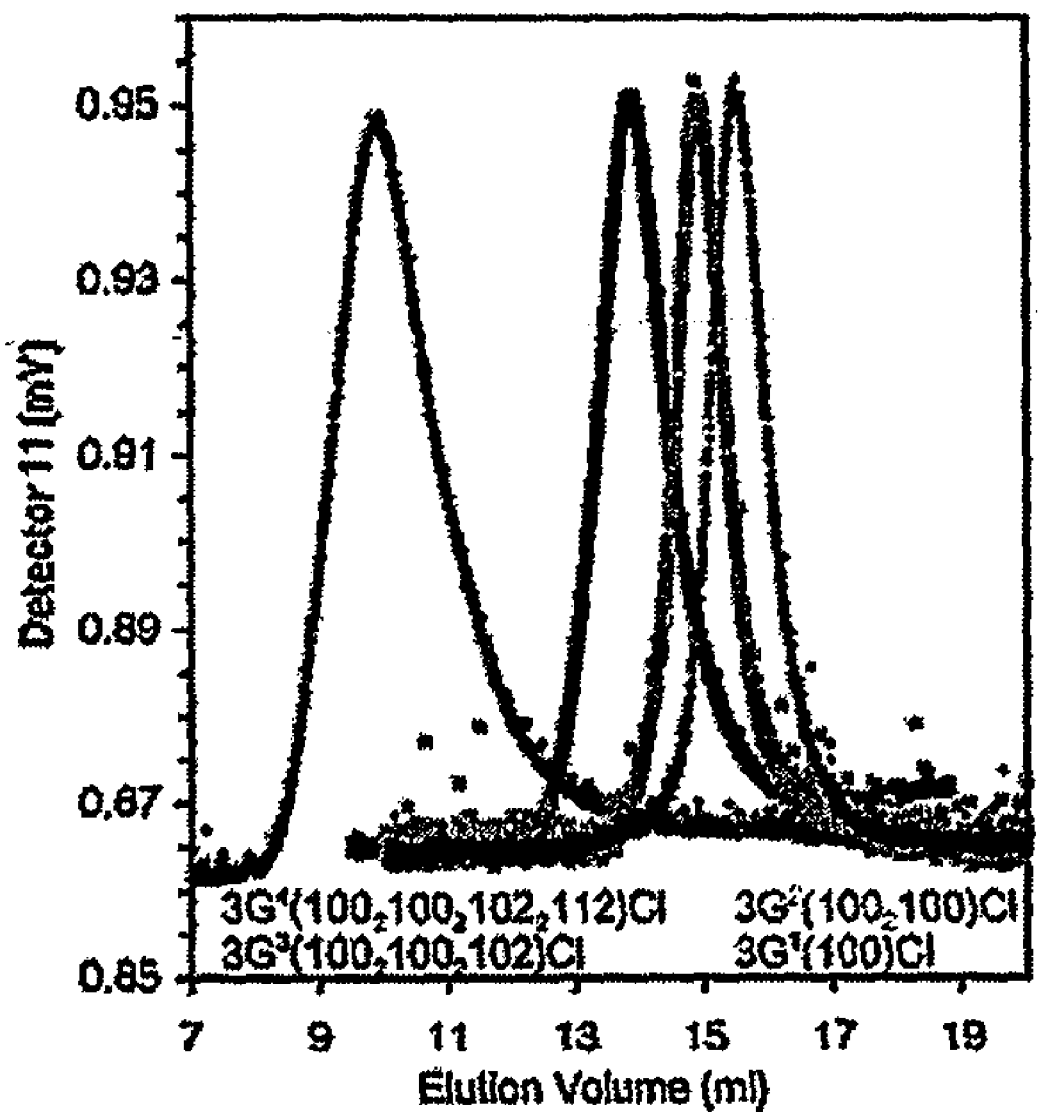
FIG. 7 is a graph which depicts SEC-MALLS analysis of dendritic poly(methyl methacrylate) during the synthesis of $3G^4(100_2100_2102_2112)Cl$.

FIG. 7 depicts SEC-MALLS analysis of dendritic poly (methyl methacrylate) during the synthesis of 3G$^4$ (100$_2$100$_2$102$_2$112)Cl. The SEC-MALLS traces shown in FIG. 7 confirm the monomodal character of the GPC chromatograms from FIG. 6(c). It is well known that SEC-MALLS detects the presence of small concentrations of high molecular weight fractions and their absence from the SEC-MALLS traces shows that there are no intermolecular secondary reactions or if they occur their extent is so small that it is not detectable by any of the analytical methods used.

Figure 8:
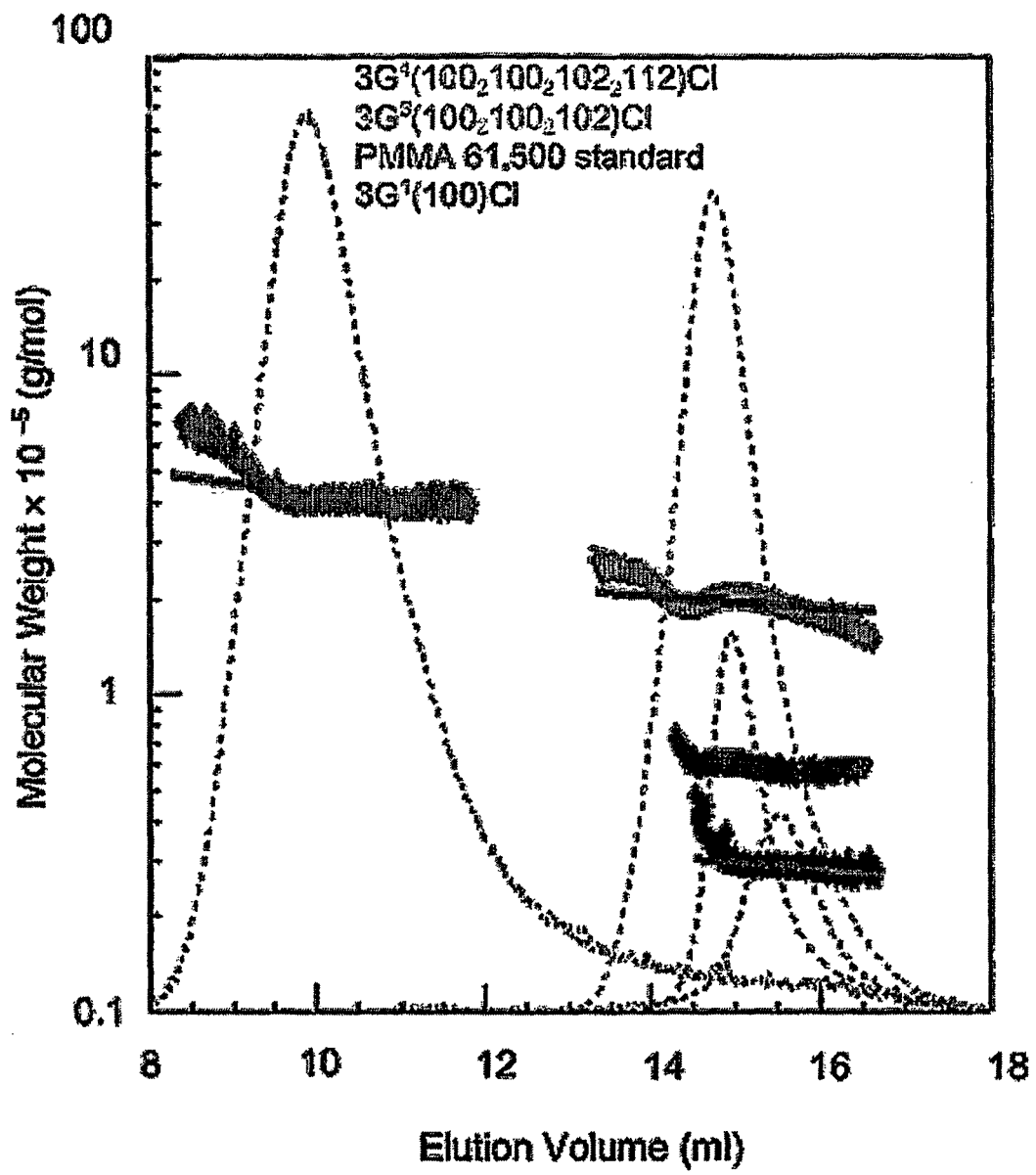
FIG. 8 is a graph which depicts comparative molar mass evolution for a linear poly(methyl methacrylate) standard and three generations of dendritic poly(methyl methacrylate).

In conventional size exclusion chromatography (SEC) or GPC the highest molecular weights elute at the lowest elution volume (V$_e$), and the radius of gyration (R$_g$) increases with molecular weight. Therefore, both the values of molecular weight and R$_g$ are expected to show a linear decrease with the increase of V$_e$. A linear poly(methyl methacrylate) standard was used to test this linearity and compare it to that of the dendritic poly(methyl methacrylate). FIG. 8 depicts a comparative molar mass evolution for a linear poly(methyl methacrylate) standard and three generations of dendritic poly (methyl methacrylate) synthesized by a combination of living radical polymerization and TERMINI compound.

Figure 9:
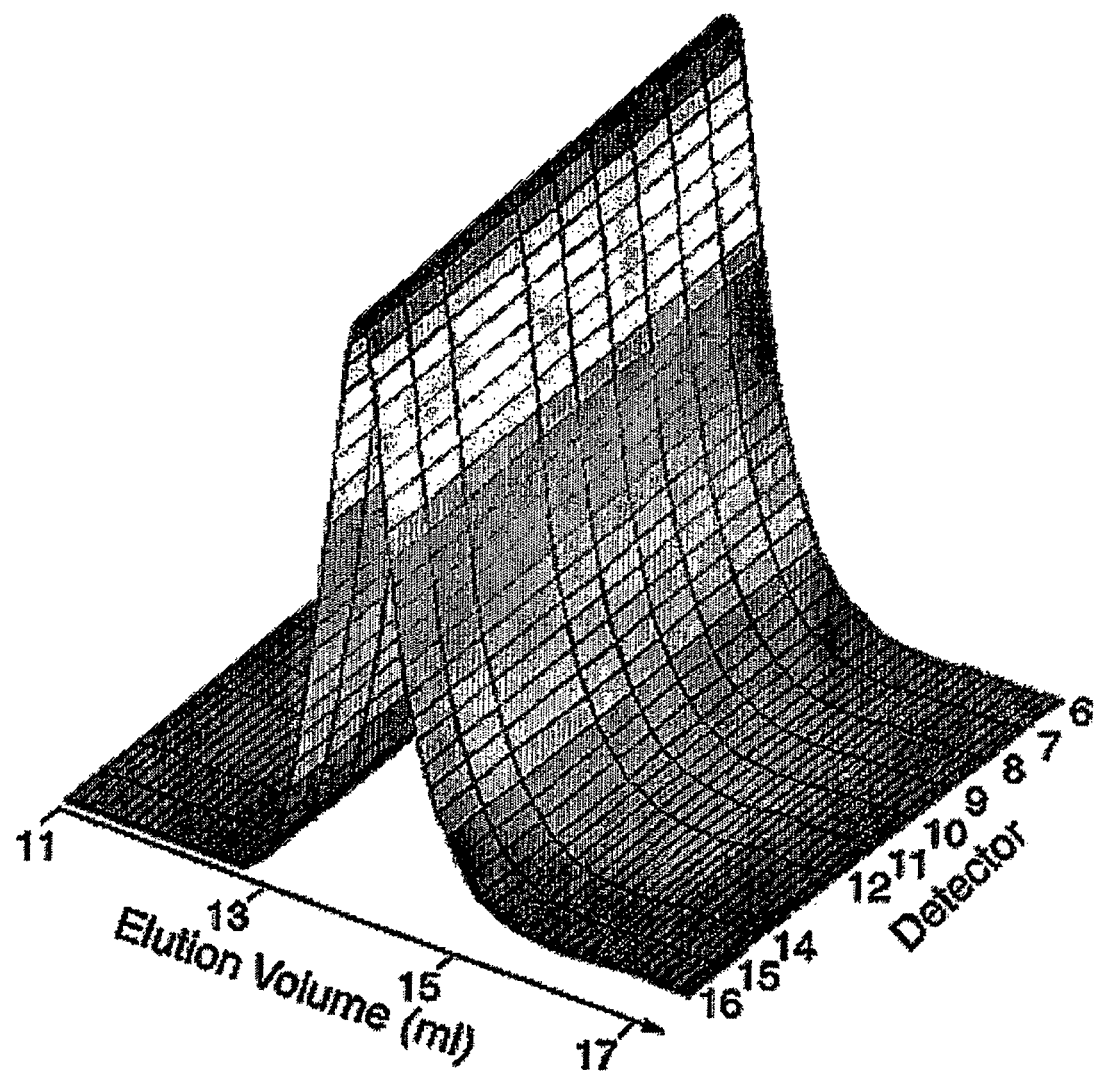
FIG. 9 is a drawing which depicts a 3-D visualization of the SEC-MALLS chromatogram of $3G^3(100_2100_2102)Cl$.

FIG. 9 depicts a 3-D visualization of the SEC-MALLS chromatogram of 3G$^3$(100$_2$100$_2$102)Cl, while FIG. 10 depicts the effect of concentration on the SEC-MALLS and the dependence of absolute molecular weight on elution volume (V$_e$) for: (a) 3G$^1$(100)Cl (c=38×10$^{-4}$ g/ml) and (b) 3G$^1$ (100)Cl (c=20×10$^{-4}$ g/ml). Absence of aggregation in solution is detected by a monomodal shape of SEC-MALLS curve in FIG. 9, and a concentration independent shape in FIG. 10.

FIG. 10 shows an interesting effect of the concentration on the shape of the peak obtained by SEC-MALLS. Although the GPC analysis of the first generation 3G$^1$(100)Cl did not reveal the presence of any low molecular weight fraction, the more sensitive SEC-MALLS analysis demonstrated a deviation from the symmetry observed as a shoulder at higher V$_e$ and therefore, expected to be of lower molecular weight on the curve obtained with a c=38×10$^{-4}$ g/ml.

Figures 10A, 10B:
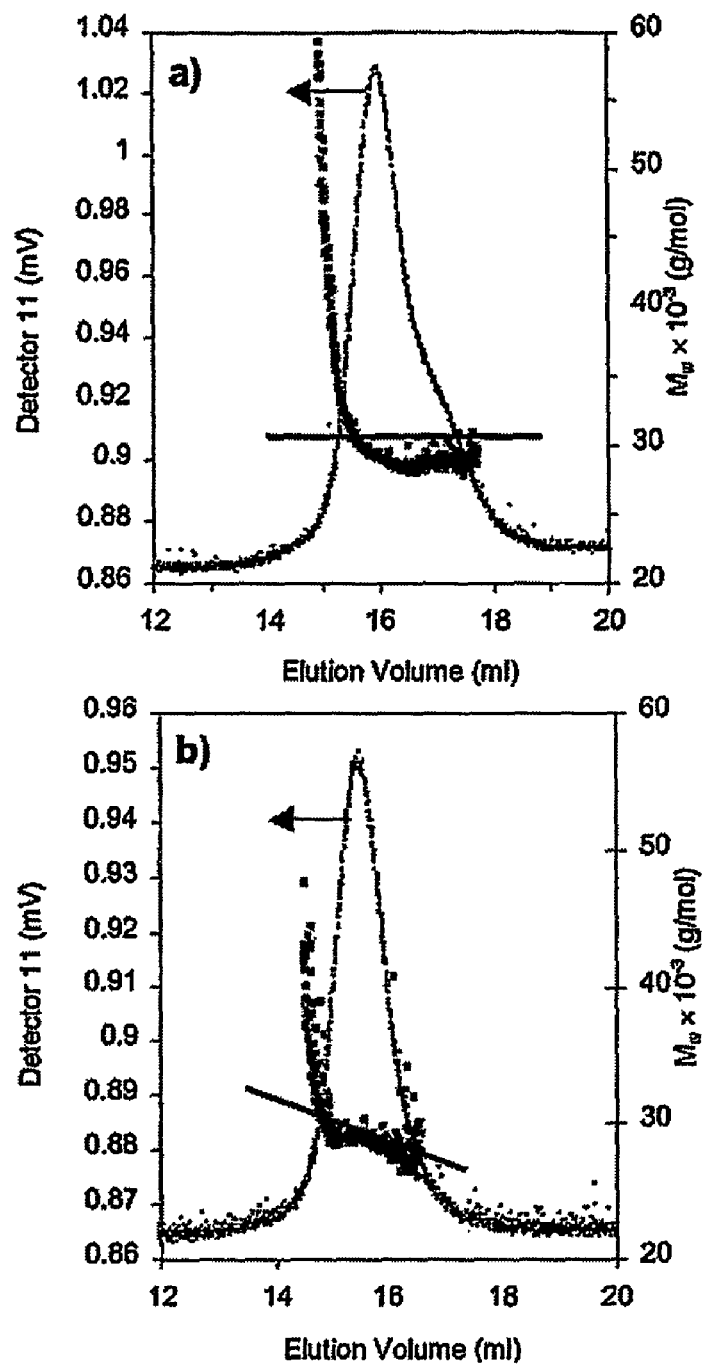
FIG. 10(a) is a graph which depicts the effect of concentration on the SEC-MALLS and the dependence of absolute molecular weight on elution volume ($V_e$) for $3G^1(100)Cl$.
FIG. 10(b) is a graph which depicts the effect of concentration on the SEC-MALLS and the dependence of absolute molecular weight on elution volume ($V_e$) for $3G^1(100)Cl$.

The plot of molecular weight versus V$_e$ from FIG. 10(a) shows that this shoulder is due to a higher molecular mass sample that does not elute via size exclusion principles. This shoulder disappears at lower concentrations (c=20×10$^{-4}$ g/ml) and at this concentration the molecular weight of the sample displays the expected trend on V$_e$, shown in FIG. 10 (b). Therefore, the shoulder from FIG. 10(a) is associated with an intermolecular aggregate of dendritic macromolecules that is concentration dependent and does not form below a certain concentration. The determination of the molecular weight of the dendritic macromolecules by SEC-MALLS experiments was performed on monomodal samples prepared by dilution experiments as the one described above exhibiting the dependence of molecular weight on V$_e$ similar to the one shown in FIGS. 9 and 10(b). The dn/dc values used in the calculation of the absolute molecular weights reported in Tables 1 and 2 were determined by successive dilution of the sample until the value remained constant.

Synthesis and Structural Analysis of A Series of Dendritic poly(methyl methacrylate) Containing Three Generations by Using Method-B. An additional series of three generations dendritic poly(methyl methacrylate) was prepared by Method-B. In this case, at a predetermined reaction time, corresponding to a certain monomer conversion, TERMINI compound was injected as benzene solution, then benzene was distilled and the polymerization process was monitored until the molecular weight of the dendritic macromolecule did not change with additional reaction time.

TABLE 2

Synthesis of Three-Arms Core Dendritic poly (methyl methacrylate) Containing Three-Generations by Using Method-B

| | [MMA] M | [—$SO_2Cl$] ×$10^2$, M | [$Cu_2O$] ×$10^2$, M | Conv %/ Time h | $M_{th}$ × $10^{-3}$ | $M_n$ × $10^{-3}$ GPC | $M_w/M_n$ GPC | dn/dc SEC-MALLS | $M_n$ × $10^{-3}$ SEC-MALLS |
|---|---|---|---|---|---|---|---|---|---|
| $3G^1(21_2)T$ | 5.16 | 21.62 | 2.17 | 88/20 | 7.2 | 7.30 | 1.09 | 0.149 | — |
| $3G^2(21_231_2)T$ | 4.13 | 6.66 | 3.88 | 50/18 | 34.4 | 16.00 | 1.15 | 0.106 | 36.67 |
| $3G^3(21_231_255_2)T$ | 3.73 | 4.55 | 2.30 | 67/25 | 199.8 | 32.70 | 1.32 | 0.103 | 203.1 |

$DP_{ARM}$ = conv × $[M]_0/[I]_0/n$, $[Cu_2O]/[biphenyl-2,3-diol]$ = ½,
T = 90° C., p-xylene, dn/dc in $cm^3g^{-1}$.

The competitive process between end-capping with TERMINI compound and polymerization is expected to produce a broader molecular weight distribution of the dendritic macromolecule than the one obtained by Method-A. However, at the same time Method-B reduces the extent of the radical side-reaction since both the excess of methyl methacrylate and TERMINI compound is available throughout the entire synthesis. The end of end-capping with TERMINI compound is monitored by GPC analysis, which follows the change in the molecular weight of the dendritic macromolecule as a function of time. When the molar mass value does not change in time the end-capping process is completed. The complete end-capping was also supported by the MALDI-TOF analysis depicted in FIG. 1, and by $^1$H-NMR spectroscopy. Therefore, after in-situ end-capping using Method-B, the dendritic macromolecule has a TERMINI compound group on each chain end. The structure of the dendritic poly(methyl methacrylate) obtained by Method-B explains the large values reported for dn/dc values reported in Table 2. However, the effect of the degree of polymerization of poly(methyl methacrylate) on the dn/dc values of dendritic macromolecule increases with degree of polymerization per arm and consequently dn/dc values decrease with the increase of the generation number.

Figure 11:
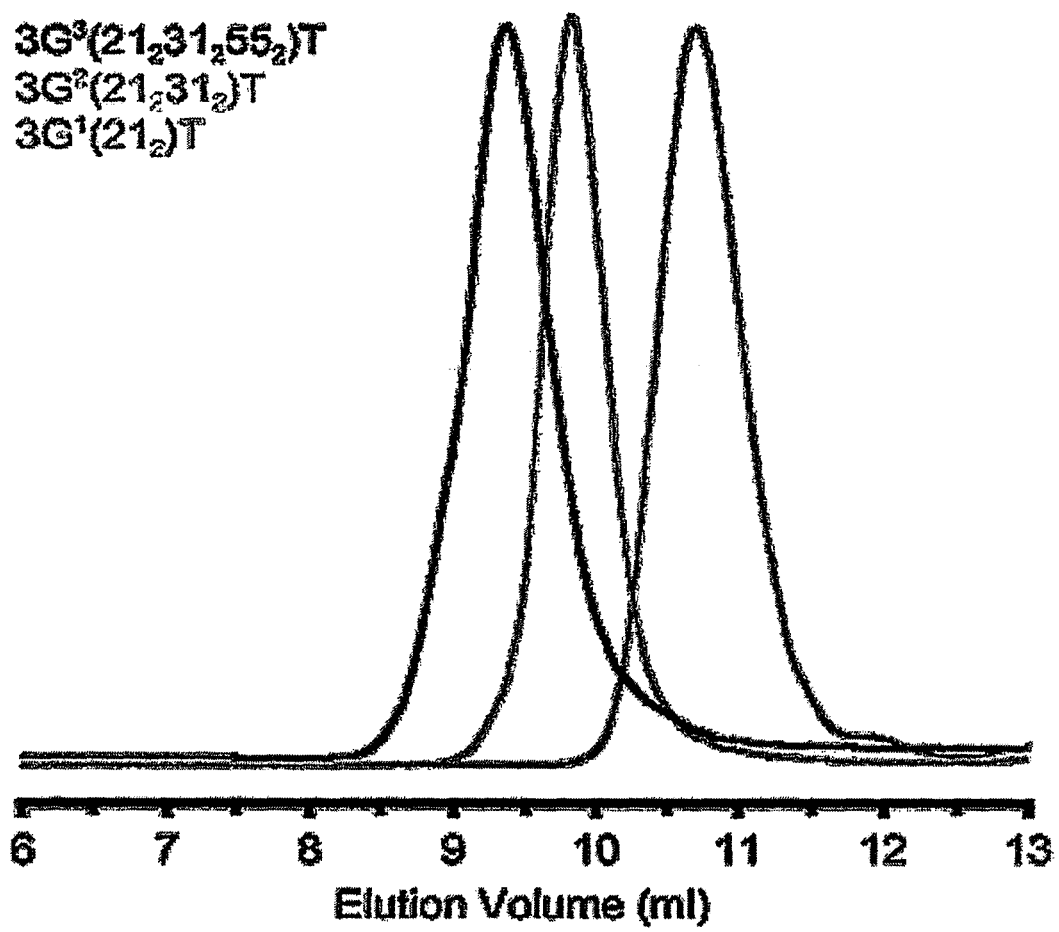
FIG. 11 is a graph which depicts GPC analysis of $3G^3$ $(21_231_255_2)T$ synthesized by inventive Method-B.
Figure 12A:
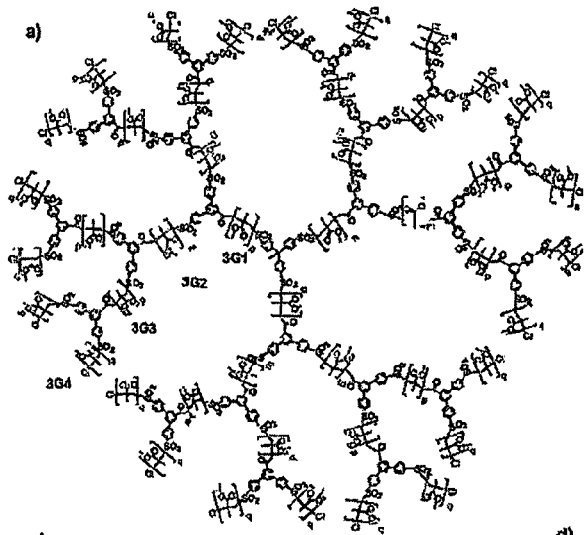
FIG. 12(a) is a drawing which depicts a dendritic macromolecule prepared by the inventive methods and having a mixed degree of polymerization and PMMA chain ends.
Figure 12B:
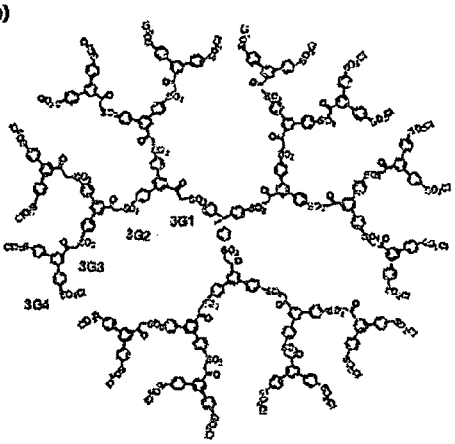
FIG. 12(b) is a drawing which depicts a dendritic macromolecule prepared by the inventive methods and having a degree of polymerization of zero.
Figure 12C:
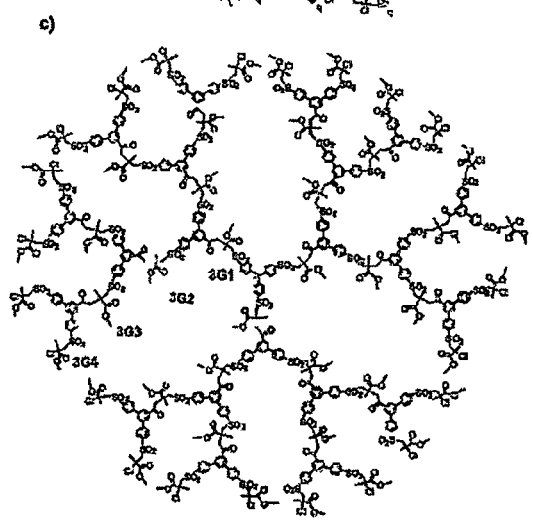
FIG. 12(c) is a drawing which depicts a dendritic macromolecule prepared by the inventive methods and having a degree of polymerization of one.
Figure 12D:
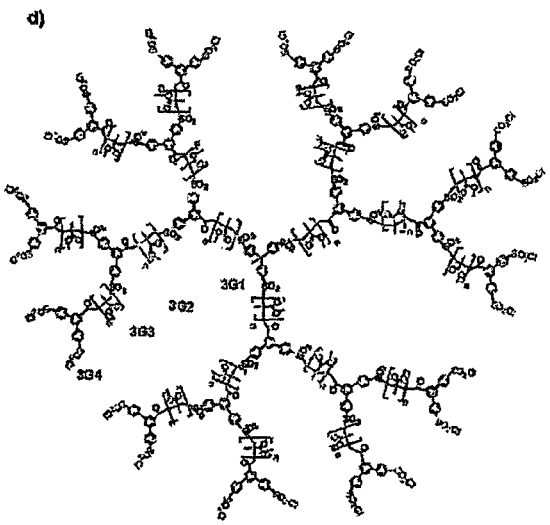
FIG. 12(d) is a drawing which depicts a dendritic macromolecule prepared by the inventive methods and having a mixed degree of polymerization and sulfonyl chloride chain ends.

FIG. 11 depicts GPC analysis of the $3G^3(21_231_255_2)T$ series of dendritic poly(methyl methacrylate) synthesized by a combination of living radical polymerization and TERMINI by using Method-B. Symmetric GPC traces were obtained for all three generations, and good agreement between $M_{th}$ and $M_{n, SEC-MALLS}$ was observed in all cases.

The only deficiency of Method-B is that the exact monomer conversion at which the end-capping with TERMINI compound is completed can not be predicted in advance of the kinetic experiment since the reactivity of TERMINI compound does not seems to be much larger than the reactivity of methyl methacrylate. Nevertheless, the reduction of the number of reactions and purification steps compensates for this deficiency.

The method we describe here provides the first example of iterative synthesis of a complex organic molecule in which two main steps from a total of three of each iteration, consist of a metal catalyzed radical reaction. The third step involves a demasking of a protective group by quantitative oxidative chlorination that takes place under mild conditions in a very short reaction time. Therefore, the methods of the inventive subject matter provide novel synthetic capabilities for free radical chain reactions and living radical polymerizations in complex organic synthesis.

Previously reported methods are limited in scope to aliphatic polyesters as branches, while the methods of the inventive subject matter can be applied to a large diversity of methacrylates, acrylates, acrylonitriles, methacrylonitriles, and styrenes. Therefore, our methods will endow for the first time a direct comparison between the physical properties of well established and well understood linear polymers and their dendritic homologues. The understanding of their physical properties will allow the description of novel technological concepts and applications based on conventional monomers.

Products of the Inventive Processes

Applicant has developed a new method of synthesis of dendritic macromolecules based on a difunctional TERMINI molecule and metal catalyzed living radical polymerization, which endows novel divergent methods for the synthesis of dendrimers of relatively uniform size and dendritic macromolecules with narrow molecular weight distribution. Four series of dendritic macromolecules containing poly(methyl methacrylate) branches were reported herein. They have been synthesized by two different iterative methods: Method-A involving 3-reaction steps in 3-pots and Method-B involving 3-reaction steps in 2-pots. The structural analysis of exemplary dendritic macromolecules demonstrates the formation of the globular shape at generations that are determined by a tandem consisting of generation number and degree of polymerization of poly(methyl methacrylate) per branch.

This result opens unprecedented strategies for the design and synthesis of dendritic macromolecules of predetermined shapes that are controlled by a combination of generation number, degree of polymerization per branch and by the chemical structure of the monomer repeat unit. The combination of TERMINI synthesis and metal catalyzed living radical polymerization can be applied to a diversity of methacrylates, acrylates, acrylonitrile, methacrylonitrile and styrenes and therefore, it has a universal character. The methods of the inventive subject matter provide access to dendritic macromolecules with unprecedented structural complexity that are derived from the largest and the simplest class of commercially available olefins.

Thus, the inventive subject matter further relates to a dendritic macromolecule produced by the process comprising the steps of:

(a) initiating the polymerization of a monomer using a multi-functional sulfonyl halide initiator having a number of sulfonyl halide functional groups, to produce a branched polymer having a number of arms corresponding to the number of sulfonyl halide functional groups said sulfonyl halide initiator has;

(b) quantitatively end-capping said branched polymer with an excess of a TERMINI compound having a thiocarbamate group, to produce an end-terminated branched polymer having a TERMINI thiocarbamate group terminating one or more branches of said branched polymer;

(c) demasking a TERMINI thiocarbamate group to produce a sulfonyl halide group by oxidative chlorination, thereby transforming a masked sulfonyl halide into an active sulfonyl halide initiator group;

(d) optionally repeating steps (b) and (c); and (e) isolating said dendritic macromolecule.

Organic polymeric electronics, photonics, and magnetic devices, integrated to intrinsic and hybridized systems, represent a highly promising interdisciplinary area of technology that will provide greatly increased functionality and the potential to meet future challenges of scalability, flexibility, low power consumption, light weight, and reduced cost. Continued advances in electronics, photonics, and magnetic systems are critically important in sustaining the Nation's economic growth, particularly in the areas of telecommunications, information technology, wearable microprocessors, organic memories, efficient solid-state lighting, alternate power generation sources, and healthcare engineering, such as the use of conductive polymers as artificial muscles and in nerve tissue replacement. Further applications include electrochromic camouflage coatings, foldable electronic newspapers, flexible large-area imaging and display systems, low-cost thin-film transistors and integrated circuits, photovoltaic devices, organic batteries and fuel cells, injection lasers, organic MEMS, and sensors. The creation of a strong scientific and technological base ranging from synthetic chemistry to device engineering, and from circuit design and systems to manufacturing will become increasingly important to advance the frontiers of this technology. This interdisciplinary research will foster interactions among various disciplines that will impact the field of organic/polymeric electronics, photonics and magnetics, thereby resulting in heretofore-unanticipated breakthroughs and enabling technologies. The inventive processes provide a basic building block, dendritic macromolecules, for such advances in technology in simple, efficient, and cost effective synthetic processes.

The products produced by the inventive processes have further specific utilities, ranging from uses in devices comprising a single supramolecule, to nanoscopic, to macroscopic. Complex chemical compounds based on TERMINI synthesis and metal catalyzed living radical polymerization are expected to simplify the development of libraries of TERMINI molecules suitable for nucleophilic and electrophilic reactions, as well as for combinations of different chain organic and living polymerization reactions. Useful devices incorporating said products include thin-film, large surface area transistors, photovoltaics, photoconductors, photorefractives, light emissives, and optoelectronics, which haves not heretofore been possible.

Other expected fields of use include artificial membranes; artificial hydrophobic channels, which can be used in a natural or artificial cell membrane; and synthetic, targeted membrane-disrupting molecules, which will have antibiotic and antimicrobial effects.

EXAMPLES

The following examples are illustrative of the inventive subject matter and are not intended to be limitations thereon. Unless otherwise indicated, all percentages are based upon 100% by weight of the final composition. All starting materials, reagents, and solvents were commercially available and were used either as obtained from chemical suppliers, without further purification, synthesized according to known literature procedures, and/or washed, dried, distilled, recrystallized, and/or purified before use.

General Methods. $^1$H-NMR (200, and 500 MHz) and C-NMR (50 and 106 MHz) spectra were recorded on Bruker spectrometers at 20° C. in CDCl$_3$ with tetramethylsilane (TMS) as internal standard. Column chromatographic purifications were conducted using 200-400 mesh silica gel obtained from Natland International Corporation, USA. Gel Permeation Chromatography analysis were performed on a Shimadzu LC-10AT high pressure liquid chromatograph equipped with: a CTO-10A column oven (30° C.) containing four AM gel columns (10 mm, 500 Å, 10$^4$ Å, 10$^5$ Å and 10$^6$ Å), a PE Nelson Analytical 900 Series integrator data station, a Shimadzu RID-10A RI detector, and a SPD-10A UV-Vis detector (254 nm). Dichloromethane (Fisher) was used as eluent at a flow rate of 2 ml/min. $M_n$ and $M_w$ were determined using calibration plots constructed with poly(methyl methacrylate) standards. Size Exclusion Chromatography Multi Angle Light-Scattering (SEC-MALLS) analysis was performed on a Wyatt EOS system (18 angles) equipped with Polymer Standard columns (10 mm, 500 Å, 10$^4$ Å and 10$^5$ Å) and THF as eluent. A flow rate of 1 ml/min and 23° C. were set for these experiments. The light source was a 30 mW linear polarized GaAs (gallium arsenide) laser with 1=690 nm. A Wyatt Optilab DSP (RI detector) was used as the concentration detector. The concentrations of the injected solutions were in the range of 1-4 g/L. Solutions of dendritic macromolecules in THF for light scattering and dn/dc experiments were made by dissolving weighted quantities (Shimadzu microbalance, model AW 220 with an accuracy of 0.1 mg) in a known volume of filtered solvent (0.22 mm Millipore filters). Stock solutions for dn/dc experiments were equilibrated for 1 h before analysis and dilutions were made on a volumetric basis, by addition of known amounts of filtered solvent. The specific refractive index (dn/dc) values were determined on a Wyatt Optilab DSP polarimeter at 690 nm in THF at 23° C. This was calibrated against NaCl—H$_2$O mixtures. Matrix Assisted Laser Desorption Ionization Time of Flight (MALDI-TOF) spectrometry analysis was performed on a Voyager-DE (Applied Biosystems) with a 337 nm nitrogen laser (pulse width, 3 ns), accelerating potential of 24 kV, positive ionization. The sample preparation was done by using dried droplet method: 4.3 mg of 4-hydroxybenzylidene malonitrile were dissolved in 400 ml MeCN-HPLC grade with 0.1% TFA (v/v). 2.2 mg of 3G$^1$(6$_2$)T were dissolved in 40 ml THF-HPLC grade. NaCl 2.0 mg was dissolved in 1 ml of freshly distilled H$_2$O. Successively, 0.5 ml from each of the prepared solutions described above were spotted on the target and allowed to dry for 20 min in the air.

All materials, unless otherwise noted, were purchased from Aldrich and used as received. Methyl methacrylate (MMA) (99+% purity) was passed through a basic Al$_2$O$_3$ chromatographic column (flash). A lecture bottle with chlorine gas (Aldrich, 99.5+%, 454 g) was equipped with a CGA-180 valve (Aldrich) and a Teflon tubing (GPC type from Shimadzu, diameter=3 mm) to bubble the Cl$_2$ for oxidative chlorination experiments at a flow rate of 2 g/min. CuCl (Fisher, 96%) was purified by grinding and stirring with $H_2SO_4$ (1N), followed by filtration and successive washing with glacial HOAc (four times), EtOH and $Et_2O$. The white CuCl powder was dried at 100° C. for 30 min and stored in an airtight bottle. Benzene was purified on activated alumina columns. Copper (I) oxide (95+%) was used as received from Alfa. The 1,1,1-tris(4-chlorosulfonylphenyl)ethane (3PSC) initiator and the 3,5-bis(S-phenyl 4-N,N'-diethylthiocarbamate)acetophenone precursor to TERMINI compound were synthesized as reported previously.

Example 1

An exemplary $^1$H-NMR analysis for the synthesis of $3G^2(20_227)Cl$ starting from $3G^1(20)Cl$. The 500 MHz $^1$H-NMR spectrum of $3G^1(20)Cl$ shown in FIG. 2 exhibits the resonance of methoxy protons from the poly(methyl methacrylate) main chain (signal c) at 3.57 ppm and the resonance of the methoxy protons of terminal methyl methacrylate unit capped with an ω-end chlorine (signal d) at 3.73 ppm. The methoxy protons of the poly(methyl methacrylate) vicinal to the aryl sulfonyl moiety from 3PSC initiator (signal b) are observed at 3.67 ppm. In addition the 3PSC initiator fragment exhibits the aromatic resonance $a_1$ at 7.23 ppm and $a_2$ at 7.8 ppm. The ratio between the integrals of $a_1$, $a_2$, d, and b is used to demonstrate not only the quantitative initiation but also the perfect degree of functionalization with chlorine chain ends. The ratio between the integrals of c and $a_1$, $a_2$, d, and b is used to calculate the degree of polymerization of poly(methyl methacrylate) per branch (i.e., degree of polymerization$_{NMR}$). $DP_{NMR}$ is calculated with high accuracy up to values of about 100. $D_{NMR}$ agrees with the theoretical degree of polymerization determined from the kinetic experiments that monitor the monomer conversion in time by NMR, and with the values determined gravimetrically after the dendritic macromolecule was separated by precipitation in hexanes. Since there is excellent agreement between DPs determined by all these methods, in the sixth column of Table 1 we are reporting the values of $M_{th}$ that correspond to the $M_n$ of the dendritic macromolecule calculated with the aid of $DP_{th/grav}$. $M_{th}$ is calculated by using the following equation: $M_{th}=M_{Init}+C'M_{MMA}'3'2^{(n-1)}'DP$, where $M_{Init}$ is the molar mass of the initiator employed in the polymerization, C is the monomer conversion, $M_{MMA}$ is molar mass of methyl methacrylate, n is the generation number (i.e., 1, 2, 3, 4) and degree of polymerization is equal with the molar ratio of the initial monomer and sulfonyl chloride initiating groups (i.e., degree of polymerization=$[M]_0/[—SO_2Cl]_0$. The end-capping of $3G^1(20)Cl$ with TERMINI compound was qualitatively monitored by the disappearance of the resonance d at 3.73 ppm of the parent $3G^1(20)Cl$ (terminal methoxy group next to Cl-chain end), and the appearance of new resonance, c', at 3.63 ppm (terminal methoxy group next to TERMINI compound chain-end) and resonance I at 3.44 ppm (methylene protons of thiocarbamate group) of $3G^1(20_2)T$. However, quantitative end-capping was established by the integration of the e, f, g and h resonance of the $3G^1(20_2)T$ versus its $a_1$ and $a_2$ resonance since all these aromatic protons are well separated and have identical relaxation times. The demasking step of $3G^1(20_2)T$ is accomplished by the oxidative chlorination of $3G^1(20_2)T$ to transform the thiocarbamate groups into sulfonyl chloride groups and thus to provide $3G^1(20_2)SC$. During this step resonance I disappears and the signal e is shifted upfield while f is shifted downfield. This reaction is most conveniently monitored by the decrease of signal i. The $^1$H-NMR spectrum of $3G^2(20_227)Cl$ shows again the signal d that is due to the terminal methoxy group containing chlorine end. This resonance has the same chemical shift as the one from $3G^1(20)Cl$. As expected, the resonance corresponding to protons e of $3G^2(20_227)Cl$ is shifted upfield from the corresponding protons of $3G^2(20_2)SC$ and downfield from those of $3G^2(20_2)T$. degree of polymerization of poly(methyl methacrylate) per branch in $3G^2(20_227)Cl$ is calculated by the combination of techniques that was described for the analysis of $3G^1(20)Cl$. The sequence of reactions analyzed with the aid of the 500 MHz $^1$H-NMR spectra is also supported by the GPC analysis of $3G^1(20)Cl$, $3G^1(20_2)T$, $3G^1(20_2)SC$ and $3G^2(20_227)Cl$ (FIG. 3).

Figure 3:
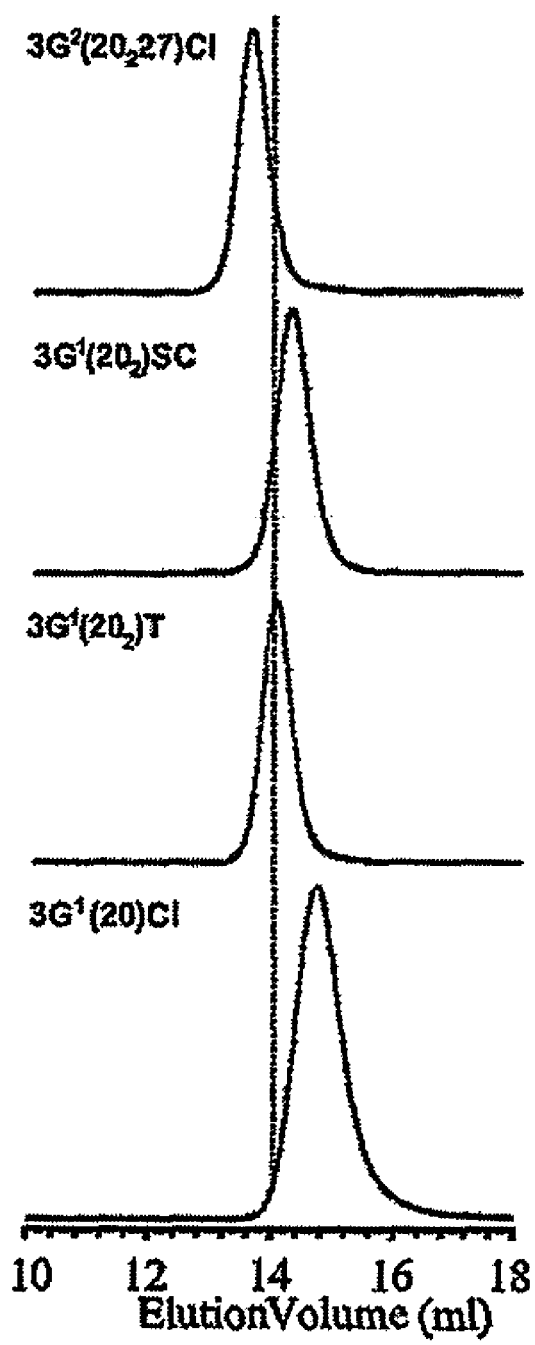
FIG. 3 is a series of comparative graphs which depict GPC analysis of the intermediary products generated during the synthesis of $3G^2(20_227)Cl$ starting from $3G^1(20)Cl$.

FIG. 3. GPC analysis of the intermediary products generated during the synthesis of $3G^2(20_227)Cl$ starting from $3G^1(20)Cl$.

As expected, end-capping of $3G^1(20)Cl$ with TERMINI compound increases its molecular weight and as a consequence a shift towards lower elution volumes ($V_e$) is observed. Oxidative chlorination of $3G^1(20_2)T$ decreases the molecular weight of the newly formed $3G^1(20_2)SC$ and this is indeed observed in FIG. 3. Finally, $3G^2(20_227)Cl$ has a higher molar mass than its precursor $3G^1(20_2)SC$ and this is demonstrated by the GPC trace from FIG. 3. The quantitative transition between these four reaction steps without any detectable side reactions is demonstrated by the monomodal molecular weight distribution of these GPC traces.

Example 2

Synthesis of (1,1-dimethylethyl) [[1-[3,5-bis(S-phenyl 4-N,N'-diethylthiocarbamate)phenyl]ethenyl]oxy]dimethyl silane (TERMINI compound). A two-neck 250 mL flask fitted with a magnetic stirring bar and $N_2$ inlet was charged with 3,5-bis(S-phenyl 4-N,N'-diethylthiocarbamate)acetophenone (6.5 g, 12.213 mmol), triethylamine (4.94 g, 48.85 mmol) and 50 mL dry $CH_2Cl_2$. To the ice-water bath cooled reaction mixture $tBuMe_2SiOTf$ (7.3 ml, 32 mmol) was added dropwise and the solution allowed to warm to 23° C. After 30 min a sample was taken, the solvent was evaporated, and the white solid was dissolved in $CDCl_3$ and analyzed by 1H-NMR. When the acetyl-protons (2.66 ppm) were absent in the $^1$H-NMR spectrum, the reaction mixture was diluted with 250 mL of $CH_2Cl_2$, washed with 100 mL KOH 10% two times, then washed with brine and dried over $Na_2SO_4$. Solvent was removed on a rotary-evaporator and the yellow solid was purified by column chromatography (silica gel, 30% EtOAc in hexanes as eluent) to produce 6.9 g (87%) of white crystals. $R_f$=0.44 (hexanes/EtOAc)=7/3). mp 143-145° C. $^1$H-NMR (200 MHz, $CDCl^3$): d 7.83-7.58 (m, 11H), 5.31 (s, 1H), 4.52 (s, 1H), 3.52 (q. 8H), 1.27 (b, 12H), 1.03 (s, 9H), 0.26 (s, 6H); C NMR (90 MHz, $CDCl_3$) d 165.95, 155.97, 142.08, 141.24, 139.29, 136.44, 129.11, 126.42, 123.81, 91.93, 42.72, 26.21, 18.66, 14.13, −4.22.

Example 3

Synthesis of $3G^1(6_2)T$. Methyl methacrylate (2.0 g, 19.97 mmol), p-xylene (5 mL), initiator (3PSC, 0.500 g, 0.905 mmol), catalyst ($Cu_2O$, 80.0 mg, 0.56 mmol), ligand (biphenyl-2,3-diol, 170.0 mg, 1.09 mmol) and benzene (1 mL) were weighted directly in a 25 mL Schlenk tube. After four freeze-pump-thaw cycles, the tube was filled with Argon and the reaction mixture was heated at 90° C. in an oil bath. The reaction was monitored by $^1$H-NMR and when conversion reached 81%, 2 mL of polymerization mixture were removed and a solution of TERMINI compound (2.9 g, 4.49 mmol) dissolved in previously degassed 10 mL mixture of p-xylene/benzene (1:1) was added via cannula. The temperature was raised to 120° C. and the benzene azeotrope was distilled under Argon. The reaction was continued for 3-days then the mixture was diluted with $CH_2Cl_2$ and passed through a short basic alumina column to remove the catalyst and TERMINI compound. The solvent was removed on a rotary-evaporator to yield 0.8 g of $3G^1(6_2)T$ that was dried under vacuum for 24 h and then analyzed by MALDI-TOF. No purification by precipitation was involved. Therefore, all the species formed during polymerization and end-capping were available to be analyzed by MALDI-TOF ($M_n$=3,873 and $M_w/M_n$=1.02, $M_{th}$=3,834). All the ions were accounted for and no evidence of termination was found. The assigned spectrum is presented in FIG. 1.

Example 4

Synthesis of $3G^1(20)Cl$. Methyl methacrylate (11.5 ml, 106.8 mmol), p-xylene (23 mL), initiator (3PSC, 0.501 g, 0.905 mmol), catalyst ($Cu_2O$, 87 mg, 0.608 mmol) and ligand (biphenyl-2,3-diol, 192 mg, 1.23 mmol) were weighted directly in a 50 mL Schlenk tube. After four freeze-pump-thaw cycles, the tube was filled with Argon and the reaction mixture was heated at 90° C. The side arm of the tube was purged with Argon for at least 5 min before it was opened to remove samples at predetermined times using an airtight syringe. Samples were dissolved in $CDCl_3$ and the conversion was measured by $^1H$-NMR spectroscopy. After the desired conversion (61%, $M_{th}$=7,700) was reached, the reaction mixture was diluted with $CH_2Cl_2$ and passed through a short basic alumina column to remove the catalyst, then precipitated twice in cold hexanes. The product was separated by filtration and dried under vacuum to yield 6.2 g of $3G^1(20)Cl$ (58%). $M_{n,NMR}$=7,400 $M_{n,GPC}$=6,400, $M_w/M_n$=1.12. Due to the low molecular weight, SEC-MALLS analysis of this sample was not accessible.

Example 5

Synthesis of $3G^1(20_2)T$. $3G^1(20)Cl$ (2.3 g, 0.30 mmol), p-xylene (5 mL), TERMINI compound (2.31 g, 3.57 mmol), catalyst (CuCl, 44.35 mg, 0.44 mmol), ligand (biphenyl-2,3-diol, 140 mg, 0.90 mmol) and benzene (6 mL) were placed in a 50 mL Schlenk tube. After four freeze-pump-thaw cycles, the tube was filled with Argon and the reaction mixture was heated at 110° C. The side arm of the tube was purged with Argon for at least 5 min before it was opened to remove the water-benzene azeotrope and prevent TERMINI hydrolysis. The reaction was monitored for the disappearance of the corresponding Cl-chain end using $^1H$-NMR spectroscopy. After 2.5 h the reaction mixture was opened to atmosphere, diluted with $CH_2Cl_2$ then passed through a short column containing basic alumina to remove the catalyst and TERMINI compound. The solvent was distilled and the concentrated polymer solution was precipitated twice in cold hexanes and once in acidic methanol to yield 2.5 g (87%) of $3G^1(20_2)T$.

Example 6

Synthesis of $3G^1(20_2)SC$. A dilute solution of $3G^1(20_2)T$ (3.0 g, 0.33 mmol) in 300 mL $CH_2Cl_2$ was vigorously stirred with 100 mL $HCO_2H$ (1%) at 23° C. and $Cl_2$ gas was passed until the emulsion had a stable pale-yellow color. The $CH_2Cl_2$ phase was separated, washed with $H_2O$, $NaHCO_3$ and brine, dried over $Na_2SO_4$, concentrated and precipitated three times in acidic MeOH to give 2.31 g (78%) product.

Example 7

Synthesis of $3G^2(20_227)Cl$. Methyl methacrylate (7.1 g, 70.9 mmol), p-xylene (25 mL), initiator ($3G^1(20_2)SC$, 1.8 g, 0.23 mmol), catalyst ($Cu_2O$, 64 mg, 0.45 mmol) and ligand (biphenyl-2,3-diol, 140 mg, 0.89 mmol) were placed in a 50 mL Schlenk tube. After four freeze-pump-thaw cycles, the tube was filled with Argon and the reaction mixture was heated at 90° C. The side arm of the tube was purged with Argon for at least 5 min before it was opened to remove samples at predetermined times using an airtight syringe. Samples were dissolved in $CDCl_3$ and the conversion was measured by $^1H$-NMR spectroscopy. After the desired conversion (56%, $M_{th}$=24,460) was reached, the reaction mixture was diluted with $CH_2Cl_2$ and passed through a short basic alumina column to remove the catalyst, The product was precipitated twice in cold hexanes, filtered and dried under vacuum to yield 4.0 g (70%) of $3G^2(20_227_2)Cl$. $M_{n,NMR}$=24,400, $M_{n,GPC}$=20,100, $M_w/M_n$=1.08, $M_{n,SEC-MALLS}$=24,500.

Example 8

Synthesis of $3G^2(20_227_2)T$. $3G^2(20_227)Cl$ (3.0 g, 0.12 mmol), p-xylene (15 ml) TERMINI compound (2.36 g, 3.65 mmol), catalyst (CuCl, 36.21 mg, 0.36 mmol), ligand (biphenyl-2,3-diol, 114.0 mg, 0.73 mmol) and benzene (6 ml) were weighted in a 50 mL Schlenk tube. After four freeze-pump-thaw cycles, the tube was filled with Argon and the reaction mixture was heated at 110° C. The side arm of the tube was purged with Argon for at least 5 min before it was opened to remove the water-benzene azeotrope. The reaction was monitored for the disappearance of the Cl-chain end using $^1H$-NMR spectroscopy. After 4 h, the reaction mixture was opened to atmosphere, diluted with $CH_2Cl_2$ then passed through a short basic alumina column to remove the catalyst and TERMINI compound. The solvent was removed on a rotary-evaporator and the concentrated polymer solution was precipitated twice in cold hexanes and once in acidic methanol to yield 2.7 g (88%) of $3G^2(20_227_2)T$.

Example 9

Synthesis of $3G^2(20_227_2)SC$. A dilute solution of $3G^2(20_227_2)T$ (2.6 g, 0.10 mmol) in 200 mL $CH_2Cl_2$ was vigorously stirred with 100 mL $HCO_2H$ (1%) at 23° C., and $Cl_2$ gas was passed until the emulsion had a stable pale-yellow color. The $CH_2Cl_2$ phase was separated, washed with $H_2O$, $NaHCO_3$ and brine, dried over $Na_2SO_4$, concentrated and precipitated three times in acidic MeOH to give 2.5 g (96%) of $3G^2(20_227_2)SC$.

Example 10

Synthesis of $3G^3(20_227_223)Cl$. methyl methacrylate (6.15 g, 61.4 mmol), p-xylene (30 mL), initiator $3G^2(20_227_2)SC$, (2.47 g, 0.09 mmol), catalyst ($Cu_2O$, 64 mg, 0.42 mmol) and ligand (biphenyl-2,3-diol, 140 mg, 0.83 mmol) were weighted in a 50 mL Schlenk tube. After four freeze-pump-thaw cycles, the tube was filled with Argon and the reaction mixture was heated at 90° C. The side arm of the tube was purged with Argon for at least 5 min before it was opened to remove samples at predetermined times using an airtight syringe. Samples were dissolved in $CDCl_3$ and the conversion was measured by $^1H$-NMR spectroscopy. After the desired conversion (40%, $M_{th}$=57,540) was reached, the reaction mixture was diluted with $CH_2Cl_2$, passed through a short basic alumina column to remove the catalyst, then precipitated twice in cold hexanes. The product was recovered by filtration and dried under vacuum to yield 3.7 g (76%) of $3G^3(20_227_223)Cl$. $M_{n,\ NMR}$=57,450, $M_{n,\ GPC}$=35,400, $M_w/M_n$=1.05, $M_{n,\ SEC-MALLS}$=56,200.

Example 11

Synthesis of $3G^3(20_227_223_2)T$. $3G^3(20_227_223)Cl$ (2.4 g, 0.04 mmol), p-xylene (25 mL), TERMINI compound (1.93 g, 3.0 mmol), catalyst (CuCl, 30.0 mg, 0.30 mmol), ligand (biphenyl-2,3-diol, 94.5 mg, 0.61 mmol) and benzene (6 mL) were placed in a 50 mL Schlenk tube. After four freeze-pump-thaw cycles, the tube was filled with Argon and the reaction mixture was heated at 110° C. The side arm of the tube was purged with Argon for at least 5 min before it was opened to remove the water-benzene azeotrope and prevent TERMINI hydrolysis. The reaction was monitored for the disappearance of the Cl-chain end using $^1$H-NMR. After 5.5 h reaction mixture was open to atmosphere and diluted with $CH_2Cl_2$, passed through a short basic alumina column to remove the catalyst and excess of TERMINI compound. The solvent was removed on a rotary-evaporator and the concentrated polymer solution precipitated twice in cold hexanes and once in acidic methanol to yield 2.3 g (87%) of $3G^3(20_227_223_2)T$.

Example 12

Synthesis of $3G^3(20_227_223_2)SC$. A dilute solution of $3G^3(20_227_223_2)T$ (2.25 g, 0.036 mmol) in 200 mL $CH_2Cl_2$ was vigorously stirred with 100 mL $HCO_2H$ (1%) at 25° C., and $Cl_2$ gas was passed until the emulsion had a stable pale-yellow color. The $CH_2Cl_2$ phase was separated, washed with $H_2O$, $NaHCO_3$ and brine, dried over $Na_2SO_4$, concentrated and precipitated three times in acidic MeOH to give 2.0 g (91%) of dendritic poly(methyl methacrylate) initiator.

Example 13

Synthesis of $3G^4(20_227_223_230)Cl$. Methyl methacrylate (2.66 g, 26.6 mmol), p-xylene (30 mL), initiator $3G^3(20_227_223_2)SC$ (1.0 g, 0.016 mmol), catalyst ($Cu_2O$, 54 mg, 0.37 mmol) and ligand (biphenyl-2,3-diol, 117 mg, 0.74 mmol) were weighted in a 50 mL Schlenk tube. After four freeze-pump-thaw cycles, the tube was filled with Argon and the reaction mixture was heated at 90° C. The side arm of the tube was purged with Argon for at least 5 min before it was opened to remove samples at predetermined times using an airtight syringe. Samples were dissolved in $CDCl_3$ and the conversion was measured by $^1$H-NMR spectroscopy. After the desired conversion (46%, $M_{th}$=140,070) was reached, the reaction mixture was diluted with $CH_2Cl_2$, passed through a short basic alumina column to remove the catalyst, then precipitated twice in cold hexanes. The product was recovered by filtration and dried under vacuum to yield 2.1 g (89%) of $3G^4(20_227_223_230)Cl$. $M_{n,\ NMR}$=136,760, $M_{n,\ GPC}$=65,200, $M_w/M_n$=1.09, $M_{n,\ SEC-MALLS}$=149,400.

Example 14

Synthesis of $3G^1(100)Cl$. Methyl methacrylate (10.85 g, 108.0 mmol), p-xylene (11 mL), initiator (3PSC, 0.1 g, 0.181 mmol), catalyst ($Cu_2O$, 51.7 mg, 0.34 mmol) and ligand (biphenyl-2,3-diol, 112.8 mg, 0.72 mmol) were weighted directly in a 50 mL Schlenk tube. After four freeze-pump-thaw cycles, the tube was filled with Argon and the reaction mixture was heated at 90° C. The side arm of the tube was purged with Argon for at least 5 min before it was opened to remove samples at predetermined times using an airtight syringe. Samples were dissolved in $CDCl_3$ and the conversion was measured by $^1$H-NMR spectroscopy. After the desired conversion (50%, $M_{th}$=30,590) was reached, the reaction mixture was diluted with $CH_2Cl_2$, passed through a short basic alumina column to remove the catalyst, then precipitated twice in cold hexanes. The product was recovered by filtration and dried under vacuum to yield 5.0 g (91%) of $3G^1(100)Cl$. $M_{n,\ GPC}$=26,000, $M_w/M_n$=1.12, $M_{n,\ SEC-MALLS}$=29,110.

Example 15

Synthesis of $3G^1(100_2)T$. $3G^1(100)Cl$ (3.0 g, 0.10 mmol), p-xylene (10 mL) TERMINI compound (0.48 g, 0.75 mmol), catalyst ($Cu_2O$, 30.0 mg, 0.021 mmol), ligand (biphenyl-2,3-diol, 65 mg, 0.04 mmol) and benzene (6 mL) were added to a 50 mL Schlenk tube. After four freeze-pump-thaw cycles, the tube was filled with Argon and the reaction mixture was heated at 110° C. The side arm of the tube was purged with Argon for at least 5 min before it was opened to remove the water-benzene azeotrope. The reaction was monitored for the disappearance of the Cl-chain ends using $^1$H-NMR spectroscopy. After 50 h the reaction mixture was opened to atmosphere, diluted with $CH_2Cl_2$, then passed through a short basic alumina column to remove the catalyst and excess TERMINI compound, then solvent distilled and the concentrated polymer solution was precipitated twice in cold hexanes and once in acidic methanol to yield 2.8 g (91%) of $3G^1(100_2)T$.

Example 16

Synthesis of $3G^1(100_2)SC$. A dilute solution $3G^1(100_2)T$ (2.7 g, 0.08 mmol) in 200 mL $CH_2Cl_2$ was vigorously stirred with 100 mL $HCO_2H$ (1%), at 25° C., and $Cl_2$ gas was passed until the emulsion has a stable yellow color. The $CH_2Cl_2$ phase was separated, washed with $H_2O$, $NaHCO_3$ and brine, dried over $Na_2SO_4$, concentrated and precipitated three times in acidic MeOH to give 2.6 g (98%) of $3G^1(100_2)SC$.

Example 17

Synthesis of $3G^2(100_2100)Cl$. Methyl methacrylate (9.8 g, 0.97 mmol), p-xylene (12 mL), initiator $3G^1(100_2)SC$, (2.5 g, 0.08 mmol), catalyst ($Cu_2O$, 49 mg, 0.34 mmol) and ligand (biphenyl-2,3-diol, 106 mg, 0.68 mmol) were weighted in a 50 mL Schlenk tube. After four freeze-pump-thaw cycles, the tube was filled with Argon and the reaction mixture was heated at 90° C. The side arm of the tube was purged with Argon for at least 5 min before it was opened to remove samples at predetermined times using an airtight syringe. Samples were dissolved in $CDCl_3$ and the conversion was measured by $^1$H-NMR spectroscopy. After the desired conversion (50%, $M_{th}$=91,000) was reached, the reaction mixture was diluted with $CH_2Cl_2$ and passed through a short basic alumina column to remove the catalyst, then was precipitated twice in cold hexanes. The product was recovered by filtration and dried under vacuum to yield 6.2 g (80%) of $3G^2(100_2100)Cl$. $M_{n,\ GPC}$=59,000, $M_w/M_n$=1.12, $M_{n,\ SEC-MALLS}$=88,300.

Example 18

Synthesis of $3G^2(100_2100_2)T$. $3G^2(100_2100)Cl$ (4.0 g, 0.04 mmol), p-xylene (14 mL), TERMINI compound (0.43 g, 0.66 mmol), catalyst ($Cu_2O$, 42.0 mg, 0.29 mmol), ligand (biphenyl-2,3-diol, 91.5 mg, 0.58 mmol) and benzene (6 mL) were weighted in a 50 mL Schlenk tube. After four freezepump-thaw cycles, the tube was filled with Argon and the reaction mixture was heated at 110° C. The side arm of the tube was purged with Argon for at least 5 min before it was opened to remove the water-benzene azeotrope. The reaction was monitored for the disappearance of the Cl-chain ends using $^1$H-NMR spectroscopy. After 16 h reaction mixture was opened to atmosphere, diluted with $CH_2Cl_2$ then passed through a short basic alumina column to remove the catalyst and excess TERMINI compound. The solvent was distilled on a rotary-evaporator and the concentrated polymer solution was precipitated twice in cold hexanes and once in acidic methanol to yield 3.2 g (77%) of $3G^2(100_2100_2)$T.

Example 19

Synthesis of $3G^2(100_2100_2)$SC. A dilute solution of $3G^2(100_2100_2)$T (3.1 g, 0.03 mmol) in 200 mL $CH_2Cl_2$ was vigorously stirred with 100 mL $HCO_2H$ (1%) at 23° C., and $Cl_2$ gas was passed until the emulsion had a stable pale-yellow color. The $CH_2Cl_2$ phase was separated and washed with $H_2O$, $NaHCO_3$ and brine, dried over $Na_2SO_4$, concentrated and then precipitated three times in acidic MeOH to give 2.6 g (98%) of dendritic poly(methyl methacrylate) initiator.

Example 20

Synthesis of $3G^3(100_2100_2112)$Cl. Methyl methacrylate (6.4 g, 64.1 mmol), p-xylene (12 mL), initiator $3G^2(100_2100_2)$SC (2.5 g, 0.03 mmol), catalyst ($Cu_2O$, 42 mg, 0.29 mmol) and ligand (biphenyl-2,3-diol, 91.1 mg, 0.58 mmol) were weighted in a 50 mL Schlenk tube. After four freeze-pump-thaw cycles, the tube was filled with Argon and the reaction mixture was heated at 90° C. The side arm of the tube was purged with Argon for at least 5 min before it was opened to remove samples at predetermined times using an airtight syringe. Samples were dissolved in $CDCl_3$ and the conversion was measured by $^1$H-NMR spectroscopy. After the desired conversion (56%, $M_{th}$=213,760) was reached, the reaction mixture was diluted with $CH_2Cl_2$, passed through a short basic alumina column to remove the catalyst, then precipitated twice in cold hexanes. The product was recovered by filtration and dried under vacuum to yield 4.7 g (77%) of $3G^3(100_2100_2112)$Cl. $M_{n,\ GPC}$=102,200, $M_w/M_n$=1.19, $M_{n,\ SEC\text{-}MALLS}$=189,300.

Example 21

Synthesis of $3G^3(100_2100_2112_2)$T. $3G^3(100_2100_2112)$Cl (3.5 g, 0.016 mmol), p-xylene (20 mL), TERMINI compound (0.62 g, 0.96 mmol), catalyst ($Cu_2O$, 10.0 mg, 0.10 mmol), ligand (biphenyl-2,3-diol, 31.5 mg, 0.21 mmol) and benzene (6 mL) were placed in a 50 mL Schlenk tube. After four freeze-pump-thaw cycles, the tube was filled with Argon and the reaction mixture was heated at 110° C. The side arm of the tube was purged with Argon for at least 5 min before it was opened to remove the water-benzene azeotrope. The reaction was monitored for the disappearance of corresponding Cl-chain end using $^1$H-NMR spectroscopy. After 8 h reaction mixture was open to atmosphere, diluted with $CH_2Cl_2$ then passed through a short basic alumina column to remove the catalyst and excess of TERMINI compound. The solvent was distilled and the concentrated polymer solution was precipitated twice in cold hexanes and once in acidic methanol to yield 2.9 g (90%) of $3G^3(100_2100_2112_2)$T.

Example 22

Synthesis of $3G^3(100_2110_2112_2)$SC. A dilute solution of $3G^3(100_2100_2112_2)$T (2.8 g, 0.013 mmol) in 200 mL $CH_2Cl_2$ was vigorously stirred with 100 mL $HCO_2H$ (1%) at 25° C., and $Cl_2$ gas was passed until the emulsion had a stable pale-yellow color. The $CH_2Cl_2$ phase was separated, washed with $H_2O$, $NaHCO_3$ and brine, dried over $Na_2SO_4$, concentrated, precipitated three times in acidic MeOH to give 2.6 g (92%) of $3G^3(100_2100_2112_2)$SC.

Example 23

Synthesis of $3G^4(100_2100_2112_2)$Cl. Methyl methacrylate (5.48 g, 54.8 mmol), p-xylene (27 mL), initiator $3G^3(100_2100_2112_2)$SC (2.5 g, 0.012 mmol), catalyst ($Cu_2O$, 64 mg, 0.44 mmol) and ligand (biphenyl-2,3-diol, 139.5 mg, 0.89 mmol) were added in a 50 mL Schlenk tube. After four freeze-pump-thaw cycles, the tube was filled with Argon and the reaction mixture was heated at 90° C. The side arm of the tube was purged with Argon for at least 5 min before it was opened to remove samples at predetermined times using an airtight syringe. Samples were dissolved in $CDCl_3$ and the conversion was measured by $^1$H-NMR spectroscopy. After the desired conversion (51%, $M_{th}$=464,080) was reached, the reaction mixture was diluted with $CH_2Cl_2$, passed through a short basic alumina column to remove the catalyst, then precipitated twice in cold hexanes. The product was recovered by filtration and dried under vacuum to yield 4.6 g (87%) of $3G^4(100_2100_2112_2102)$Cl. $M_{n,\ GPC}$=168,200, $M_w/M_n$=1.23, $M_{n,\ SOC\text{-}MALLS}$=456,200.

The inventive subject matter being thus described, it will be obvious that the same may be modified or varied in many ways. Such modifications and variations are not to be regarded as a departure from the spirit and scope of the inventive subject matter and all such modifications and variations are intended to be included within the scope of the following claims.

I claim:

1. A process for making a dendritic macromolecule from monomers using a combination of polymerization and an irreversible terminator multifunctional initiator, comprising the steps of: (a) initiating the polymerization of a monomer using a multi-functional sulfonyl halide initiator having a number of sulfonyl halide functional groups, to produce a branched polymer having a number of arms corresponding to the number of sulfonyl halide functional groups of said sulfonyl halide initiator; (b) quantitatively end-capping said branched polymer with an excess of a TERMINI compound having a thiocarbamate group, to produce an end-terminated branched polymer having a TERMINI thiocarbamate group terminating one or more branches of said branched polymer; and (c) demasking a TERMINI thiocarbamate group to produce a sulfonyl halide group by oxidative chlorination, thereby transforming a masked sulfonyl halide into an active sulfonyl halide initiator group; wherein said monomer is selected from methacrylates, acrylates, acrylonitriles, methacrylonitriles, styrenes, and combinations thereof and said TERMINI compound is (1,1-dimethylethyl)[[1-[3,5-bis(S-phenyl 4-N,N'-diethylthiocarbamate)phenyl]ethenyl]oxy] dimethylsilane.

2. The process of claim 1, wherein said excess of a TERMINI compound is about four times excess.

3. A process for making a dendritic macromolecule from methyl methacrylate using a combination of living radical polymerization and an irreversible terminator multifunctional initiator, which comprises the steps of: (a) initiating a $Cu_2O$/biphenyl-2,3-diol catalyzed living radical polymerization of methyl methacrylate using 3PSC as a trifunctional initiator, to produce a star polymer $3G^1(n)$Cl having three arms, wherein 3 is for a trifunctional core, $G^1$ refers to the first generation, n is the degree of polymerization per arm, and Cl is the functionality present at the chain ends of each arm; (b) quantitatively end-capping said $3G^1(n)Cl$ using a four times excess of TERMINI compound, to produce $3G'(n_2)T$, wherein subscript 2 from $3G^1(n_2)T$ is the number of new arms generated from each TERMINI compound branching point located at the end of poly(methyl methacrylate) of degree of polymerization n, while each T is a TERMINI compound chain end; and (c) demasking N,N'-diethylthiocarbamate groups of the $3G'(n_2)T$ into sulfonyl chloride groups by oxidative chlorination of $3G'(n_2)T$, to transform masked sulfonyl chlorides into active aryl sulfonyl chloride initiator groups, to produce $3G^1(n_2)SC$, wherein SC is sulfonyl chloride to initiate the metal catalyzed living radical polymerization of methyl methacrylate to produce the second generation $3G^2(n_{2m})Cl$, wherein m is the degree of polymerization per arm of poly(methyl methacrylate) from said second generation and said TERMINI compound is (1,1-dimethylethyl) [[1-[3,5-bis (S-phenyl 4-N,N'-diethylthiocarbamate)phenyl]ethenyl] oxy] dimethylsilane.

4. The process of claim 1, wherein said monomer is methyl methacrylate.

5. The process of claim 1, wherein said sulfonyl halide initiator is an aryl sulfonyl chloride.

6. The process of claim 5, wherein said aryl sulfonyl chloride initiator is 1,1,1-tris(4-chlorosulfonylphenyl)ethane.

7. The process of claim 3, wherein said excess of a TERMINI compound is about four times excess.

* * * * *